(12) United States Patent
Sasaki

(10) Patent No.: US 6,433,929 B1
(45) Date of Patent: Aug. 13, 2002

(54) SCANNING OPTICAL MICROSCOPE AND METHOD OF ACQUIRING IMAGE

(75) Inventor: Hiroshi Sasaki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/877,767

(22) Filed: Jun. 8, 2001

(30) Foreign Application Priority Data

Jun. 12, 2000 (JP) ........................................ 2000-175630
Sep. 18, 2000 (JP) ........................................ 2000-282695

(51) Int. Cl.$^7$ ............................................. G02B 21/06
(52) U.S. Cl. ..................... 359/388; 359/368; 359/212; 250/461.1
(58) Field of Search ................................ 359/212, 234, 359/223, 368, 385, 388; 250/461.1, 461.2; 356/320

(56) References Cited

U.S. PATENT DOCUMENTS 5,260,578 A * 11/1993 Bliton et al. .............. 250/461.1
5,296,703 A * 3/1994 Tsien .......................... 250/235
5,583,342 A * 12/1996 Ichie ........................ 250/459.1

FOREIGN PATENT DOCUMENTS

| JP | 06-16927 | 3/1994 |
| JP | 07-333508 | 12/1995 |
| JP | 08-043739 | 2/1996 |
| JP | 08-271792 | 10/1996 |
| JP | 10-206745 | 8/1998 |
| JP | 2000-010152 | 1/2000 |

* cited by examiner

Primary Examiner—Cassandra Spyrou
Assistant Examiner—Mark A. Robinson
(74) Attorney, Agent, or Firm—Frishauf, Holtz, Goodman & Chick, P.C.

(57) ABSTRACT

A scanning optical microscope comprises a light source configured to selectively output to a sample dyed with two or more types of fluorescent dyes an excitation light having an excitation wavelength according to the each fluorescent dye, scanner configured to scan the excitation light outputted from the light source, an objective lens configured to condense the excitation light scanned by the scanner on the sample, a detector configured to detect a fluorescence of the fluorescent light dye according to the excitation light by the excitation light condensed by the objective lens, one confocal pinhole whose pinhole diameter arranged in front of the detector is adjustable, and controller configured to adjust the pinhole diameter of the confocal pinhole to a diameter suitable for the fluorescence emitted from the sample by using the excitation light in synchronization with switching of the excitation lights from the light source when acquiring one image by detecting each fluorescence according to each excitation light in the time division manner through the confocal pinhole by switching the excitation lights with which the sample is irradiated in synchronization with scanning by the scanner.

16 Claims, 15 Drawing Sheets

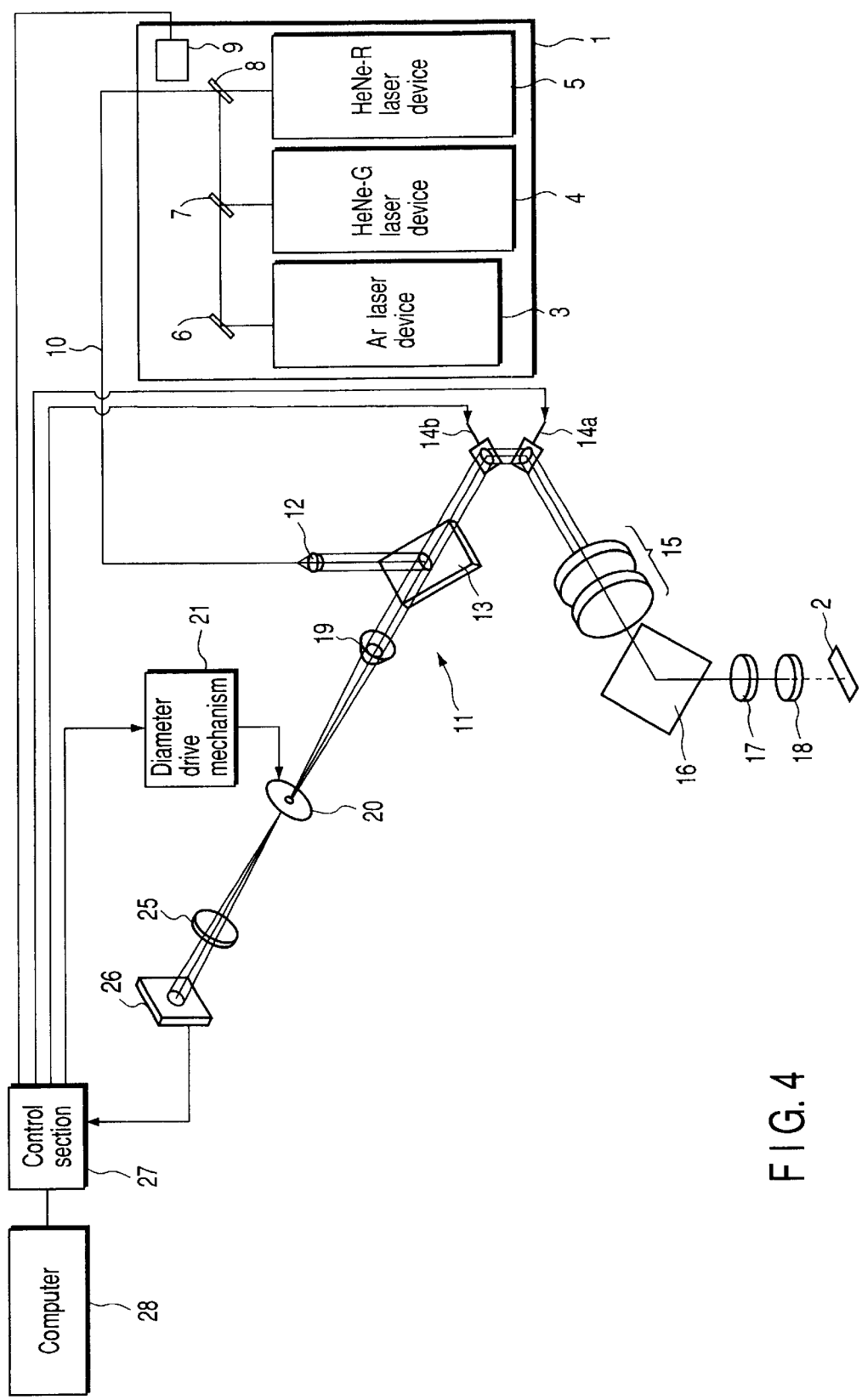
F I G. 4

SCANNING OPTICAL MICROSCOPE AND METHOD OF ACQUIRING IMAGE

CROSS-REFERENCE TO RELATED APPLICATION

This application is based upon and claims the benefit of priority from the prior Japanese Patent Application No. 2000-175630 and 2000-282695, filed Jun. 12, 2000 and Sep. 18, 2000, respectively, the entire contents of which are incorporated herein by reference.

BACKGROUND OF THE INVENTION

1. Field of the Invention

The present invention relates to a method of acquiring an image and a scanning optical microscope for irradiating a sample emitting two or more types of fluorescences, namely, a multi-dye fluorescent sample with an excitation light as a light spot by condensing the light by an objective lens and detecting each fluorescence emitted from this sample by a photodetector through a pinhole, thereby acquiring an image of that sample.

2. Description of the Background Art

As a scanning optical microscope, there are known the following microscopes. One confocal pinhole is arranged at a position which is also conjugated by a sample. When the surface of the sample is scanned by a light spot, a plurality of rays of fluorescence are emitted from the sample. The rays of fluorescence emitted from the sample are led to the confocal pinhole. A plurality of the rays of fluorescence are subjected to optical path division by a dichroic mirror or a grating. A plurality of photodetectors corresponding to the respective rays of fluorescence are arranged to these optical paths, and a ray of fluorescence corresponding to each photodetector is detected (see Jpn. Pat. Appln. KOKAI Publication No. 8-43739).

When trying to simultaneously acquire a plurality of rays of fluorescence, a wavelength of fluorescence emitted from a fluorescent dye on a short wavelength side and a wavelength of fluorescence emitted from a fluorescent dye on a long wavelength side overlap each other. In a sample dyed using two or more kinds of fluorescent dyes, a fluorescent dye FITC is excited with an excitation wavelength of 488 nm, and emits a ray of fluorescence having a central wavelength of 520 nm. A fluorescent dye Cy5 is excited with an excitation wavelength of 633 nm, and emits a ray of fluorescence having a central wavelength of 670 nm. These wavelengths of fluorescence overlap each other and, as shown in FIG. 1, a phenomenon called "fluorescent cross talk" in which a ray of fluorescence on the short wavelength side (FITC) is mixed occurs in a detector configured to detect a ray of fluorescence on the long wavelength side (Cy5).

In order to avoid the fluorescent cross talk, there is known a technique for detecting the respective rays of fluorescence in the time division manner (see Jpn. Pat. Appln. KOKAI Publication No. 10-206745). This technique carries out switching of each excitation wavelength for exciting a sample dyed by two or more kinds of fluorescent dyes and a optical path to each detector configured to detect each ray of fluorescence in synchronization with light scanning.

At this time, switching of the excitation wavelength and the detection optical path is performed relative to a command for acquiring an image issued by a computer in accordance with one-frame scanning or each one line or during photo acceptance of one pixel, and each ray of fluorescence is detected in the time division manner, thereby acquiring an image. Further, a product catalogue of, for example, ZEISS Co. Ltd. discloses a product such that a galvanometer mirror on a high-speed scanning side which is light scanner reciprocates for scanning and the excitation wavelength is switched by an acousto-optic device (AOTF) for selecting a wavelength in accordance with an outward route and an inward route to detect different rays of fluorescence in the respective routes, thereby avoiding the fluorescent cross talk.

The confocal effect in the scanning optical microscope depends on dimensions of a diameter of a confocal pinhole and a diameter of a light spot (diffraction ray) according to a wavelength of each ray of fluorescence whose image is formed on the confocal pinhole.

That is, although it is ideal to reduce the diameter of the confocal pinhole in order to increase the resolution, an amount of fluorescence becomes extremely small. Therefore, the light which passes through the confocal pinhole and is detected becomes weak, and acquisition of an image with the excellent SN can not be expected. Thus, the dimension of the confocal pinhole diameter is matched with that of the diffraction diameter in order to optimize the brightness and the confocal effect in the direction of an optical axis. At this time, the dimension of a diffraction diameter d can be obtained by the following expression:

$d = 1.22 \cdot \lambda / NA$ $\lambda$ = central wavelength of a ray of fluorescence to be detected NA = NA of a fluorescent light flux incident upon the confocal pinhole In the above expression, the diameter of the confocal pinhole is matched with the diffraction diameter d obtained by substituting a fluorescent light wavelength $\lambda$ to be detected and NA of the fluorescent light flux incident upon the confocal pinhole determined by an objective lens.

In the above-described prior art technique, however, since a plurality of fluorescences emitted from the sample pass through one confocal pinhole, the diameter of the confocal pinhole can matched with only the fluorescence relative to one excitation wavelength. For example, when an excitation wavelength of 488 nm is used for excitation, the FITC emits a fluorescence having a central wavelength of 520 nm. Further, when an excitation wavelength of 633 nm is used for excitation, the Cy5 emits a fluorescence having a central wavelength of 670 nm. Therefore, assuming that NA of a fluorescence incident upon the confocal pinhole is 0.0063, the diameter of the confocal pinhole which is optimum for a fluorescence of FITC is as follows:

| Confocal pinhole diameter | = 1.22 · $\lambda$/NA |
| | = 1.22 · 0.52/0.0063 |
| | = 100 $\mu$m |

Moreover, the confocal pinhole diameter which is optimum for the fluorescent light of Cy5 is as follows:

| Confocal pinhole diameter | = 1.22 · $\lambda$/NA |
| | = 1.22 · 0.67/0.0063 |
| | = 130 $\mu$m |

Therefore, when the confocal pinhole diameter is set to 100 $\mu$m, it is possible to obtain the confocal pinhole diameter which is optimum for the fluorescent light of FITC. However, for the fluorescent light of Cy5, the confocal pinhole diameter is too small, and a bright fluorescent image can not be obtained.

In addition, when the confocal pinhole diameter is set to 130 μm, the confocal pinhole diameter which is optimum for the fluorescent light of Cy5 can be obtained. However, for the fluorescent light of FITC, the confocal pinhole diameter is too large, and the confocal effect is reduced.

In order to eliminate the above-described problems, there is disclosed a technique for optimizing the resolution and the brightness by matching the dimension of the pinhole diameter with the diffraction diameter by which the light from the sample is formed on the confocal pinhole plane (see Jpn. Utility Model Appln. KOKAI Publication No. 06-16927). By using this technique, an opening size (dimension of the pinhole diameter) of the confocal pinhole can be changed in accordance with an objective lens to be used or a wavelength to be observed.

As an adjustment mechanism for the opening size of the confocal pinhole, there is a method for performing. adjustment by arranging a plurality of pinholes on a concentric circle on a turret and rotating this turret (see Jpn. Utility Model Appln. KOKAI Publication No. 6-16927) or a method for performing adjustment by continuously moving and changing a pair of square openings each having a V shape by using a direct acting type motor (see Jpn. Pat. Appln. KOKAI Publication No. 2000-10152).

On the other hand, in a scanning optical microscope for observing fluorescences, a characteristic of a dichroic mirror for separating the illuminating lights to the sample and the fluorescences from the sample must be switched in accordance with the excitation wavelength of the sample to be observed or the fluorescent light spectral characteristic (see Jpn. Pat. Appln. KOKAI Publication No. 7-333508).

When this dichroic mirror is switched, since an image formation position on the confocal pinhole plane is shifted due to an error in a mounting angle or a difference in the parallelism of the dichroic mirror, the center of the confocal pinhole and the image formation position must be corrected by moving the optical axis or the confocal pinhole position.

As the correction method, there is, for example, a criss-cross moving stage system using two motors for moving the confocal pinhole itself within the plane (see Jpn. Pat. Appln. KOKAI Publication No. 7-333508) or a system for matching the image formation position with the center of the confocal pinhole by rotating two parallel plane glasses by a motor and then moving the optical axis (see Jpn. Pat. Appln. KOKAI Publication No. 8-271792).

BRIEF SUMMARY OF THE INVENTION

It is an object of the present invention to provide a method of acquiring an image and a scanning optical microscope by which the cross talk does not occur in all fluorescences and an optimum confocal effect can be obtained in accordance with each fluorescence to be detected when detecting a plurality of fluorescences.

It is another object of the present invention to provide a scanning optical microscope by which mechanical abrasion in a driving section does not occur and a speed of diameter correction by means for effectively restricting the diffraction diameter can be increased.

The present invention is characterized in that, when an excitation light having an excitation wavelength according to each fluorescent dye is switched and emitted with respect to a sample dyed with two or more kinds of fluorescent dyes in synchronization with light scanner and each fluorescence according to each excitation light is detected through one confocal pinhole in the time division manner to obtain one image, a pinhole diameter of the confocal pinhole is adjusted to a diameter suitable for the fluorescence emitted from the sample by the excitation light in accordance with the wavelength of the excitation light.

Specifically, the structure of the present invention is described as follows. It is to be noted that the "pinhole" means a transmission type pinhole such that the fluorescence passes through the pinhole as well as a reflection type pinhole for reflecting the fluorescence such as a mirror having a pinhole shape.

According to the present invention, there is provided a scanning optical microscope comprising: a light source configured to selectively output an excitation light having an excitation wavelength according to each fluorescent dye to a sample dyed with two or more kinds of fluorescent dyes; scanner configured to scan the excitation light outputted from the light source; an objective lens configured to condense the excitation light scanned by the scanner onto the sample; a detector configured to detect a fluorescence having the fluorescent dye according to the excitation light by using the excitation light condensed by the objective lens; one confocal pinhole capable of adjusting a diameter of a pinhole arranged in front of the detector; controller configured to adjust a pinhole diameter of the confocal pinhole to a diameter suitable for the fluorescent rays emitted from the sample by the excitation light in synchronization with switching of the excitation light from the light source when each fluorescence according to each excitation light is detected in the time division manner through the confocal pinhole to acquire one image by changing over the excitation light with which the sample is irradiated in synchronization with scanning of the scanner. Preferred embodiments according to the present invention are as follows. It is to be noted that each of the following embodiments may be solely applied or combined and applied.

(1) The controller switches the excitation light in synchronization with scanning performed for each line relative to the sample by the light scanner.

(2) The controller switches the excitation light in synchronization with scanning performed for each frame relative to the sample by the light scanner.

(3) The controller switches the excitation light in units of pixel during scanning relative to the sample by the light scanner.

(4) The detector is configured by one detector.

(5) There is further included a barrier filter which is fixed in front of the detector, blocks two or more types of excitation lights for exciting the two or more types of fluorescences and transmits therethrough two or more types of fluorescences emitted from the sample.

(6) There are further included: a first barrier filter which blocks a first excitation light of the excitation lights and transmits therethrough fluorescences emitted from the sample by the first excitation light; a second barrier filter which blocks a second excitation light of the excitation lights and transmits therethrough fluorescences emitted from the sample by the second excitation light; and means for switching the first barrier filter and the second barrier filter between the confocal pinhole and the detector in synchronization with change of the excitation lights.

(7) The confocal pinhole is a minute device group having a plurality of minute devices, and a plurality of the minute devices are controlled by minute device controller.

(8) The confocal pinhole includes a minute device group configured by arranging a plurality of minute deflecting mirrors in the form of a two-dimensional matrix, and further includes minute device controller configured to control an angle of each minute deflecting mirror in the diffraction diameter in such a manner that the light spot is reflected in an arrangement direction of the photodetector and controlling an angle of each minute deflecting mirror outside the diffraction diameter to an angle different from that of each minute deflecting mirror in the diffraction diameter.

(9) In (7) or (8), the minute device group controller has a function for varying an area of each minute device for controlling to lead the light spot to the photodetector in accordance with the dimension of the diffraction diameter imaged to the minute device group.

(10) In (7) or (8), the minute device group controller has a function for correcting a central position of each minute device for controlling to lead the light spot to the photodetector in accordance with the displacement of the light spot imaged to the minute device group.

(11) In (10), there is provided a function for correcting the displacement of the light spot in the minute device group generated by switching of at least one optical device arranged between the sample and the minute device group.

(12) In (7) or (8), there are further included: a light source capable of selectively outputting to a sample dyed with two more types of fluorescent dyes an excitation light having an excitation wavelength according to each fluorescent dye; scanner configured to scan an excitation light outputted from the light source; and an objective lens configured to condense the excitation light scanned by the scanner, wherein the minute device group controller adjusts each minute device of the minute device group for leading a light from the sample to the photodetector to a diffraction diameter of a light spot imaged to the minute device group through the confocal lens in synchronization with switching of the excitation light from the light source when each fluorescence according to each excitation light is detected in the time division manner through one minute device group to acquire one image by changing over the excited lights with which the sample is irradiated in synchronization with scanning of the light scanner.

(13) In (12), switching of excitation lights by the minute device group controller is synchronized with scanning in accordance with each one line or scanning in an outward route and an inward route by the light scanner, respectively.

(14) In (12), switching of the excitation lights by the minute device group controller is synchronized with scanning in accordance with one frame by the light scanner.

(15) In (12), switching of the excitation lights by the minute device group controller is synchronized with scanning in accordance with one pixel by the light scanner.

Since the pinhole diameter is adjusted in accordance with a wavelength of a fluorescence emitted from the sample, there occurs no cross talk in all fluorescences when detecting a plurality of fluorescences, and an optimum confocal effect can be obtained in accordance with each fluorescence to be detected.

Further, since the minute deflecting mirror is adopted as the pinhole, mechanical abrasion of the driving section is not generated, and it is possible to speed up the diameter correction or the position correction of means for restricting the effective range of the diffraction diameter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and configure a part of the specification, illustrate presently preferred embodiments of the invention, and together with the general description given above and the detailed description of the preferred embodiments given below, serve to explain the principles of the invention.

FIG. 4 is a block diagram showing a second embodiment of a scanning optical microscope according to the present invention;

DETAILED DESCRIPTION OF THE INVENTION

Preferred embodiments according to the present invention will now be described with reference to the accompanying drawings.

Figure 2:
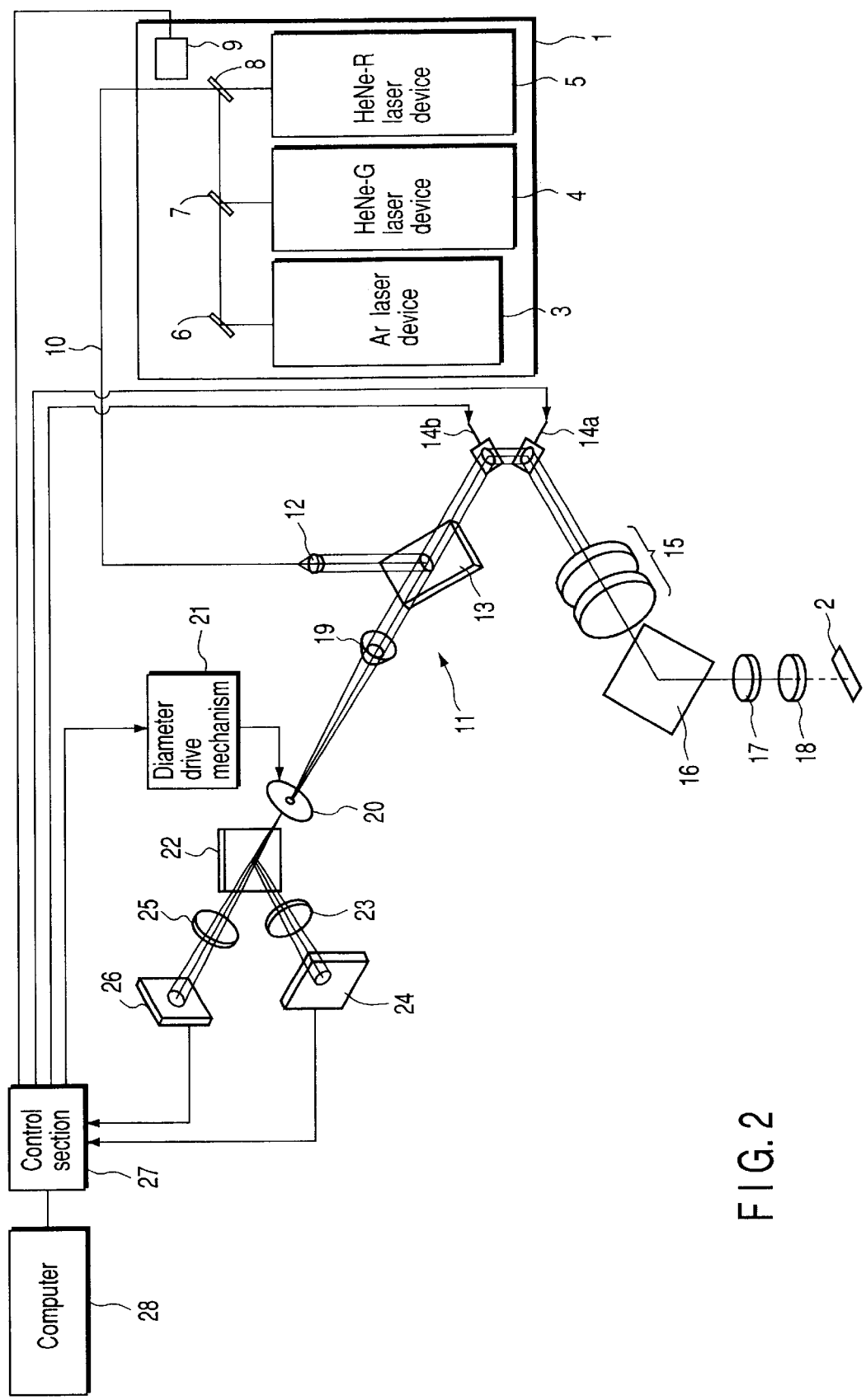
FIG. 2 is a block diagram showing a first embodiment of a scanning optical microscope according to the present invention.

FIG. 2 is a block diagram showing a scanning optical microscope according to a first embodiment. A laser unit 1 outputs each excitation laser beam having an excitation wavelength thereof to a sample 2 (multi-dye fluorescent sample) dyed with two or more types of fluorescent dyes. The laser unit 1 includes: an Ar laser device 3 for emitting an excitation laser beam having an excitation wavelength 488 nm; an HeNe-G laser device 4 for emitting an excitation laser beam having an excitation wavelength of 543 nm; an HeNe-R laser device 5 for emitting an excitation laser beam having an excitation wavelength of 633 nm; a device 6; a dichroic device 7 for combining two exiting laser beams having wavelengths of 488 nm and 543 nm; a dichroic mirror 7 for combining excitation laser beams having wavelengths of 488 nm, 543 nm and 633 nm; and an acousto-optic device (AOTF) 9 for selecting an excitation laser beam having an arbitrary wavelength among the respective wavelengths of 488 nm, 543 nm and 633 nm.

The excitation laser beam outputted from the laser unit 1, i.e., the excitation laser beam having an excitation wavelength selected by the AOTF 9 is led to a scanning unit 11 through a single-mode fiber 10. A collimator lens 12 is arranged at an emission end of the single-mode fiber 10. The collimator lens 12 forms the excitation laser beam outgoing from the single-mode fiber 10 into a parallel light.

An excitation dichroic mirror 13 is arranged on a optical path of the excitation laser beam formed into the parallel light by the collimator lens 12 The excitation dichroic mirror 13 has a characteristic for reflecting the respective excitation laser beams having the excitation wavelengths of 488 nm, 543 nm and 633 nm and a characteristic for transmitting therethrough the wavelengths of the fluorescences emitted from the sample 2.

X/Y galvanometer mirrors 14a and mirrors 14b are arranged on a reflection optical path of the excitation dichroic mirror 13. The X/Y galvanometer mirrors 14a and mirrors 14b have a function for scanning the excitation laser beams having the respective excitation wavelengths of 488 nm, 543 nm and 633 nm in the two-dimensional direction of an X direction and a Y direction on the sample 2 (the X direction may be referred to as a horizontal direction and the Y direction may be referred to as a vertical direction hereinafter). Additionally, in the present specification, as will be described in detail, it is determined that the X galvanometer mirror 14a of the X/Y galvanometer mirrors 14a and mirrors 14b carries out high-speed scanning and the Y galvanometer mirror mirrors 14b performs low-speed scanning. That is, the X galvanometer mirror 14a conducts reciprocating scanning for one line at a high speed, and the Y galvanometer mirror mirrors 14b is driven in such a manner that scanning line is shifted by one line upon completion of scanning of one line, for example. It is to be noted that scanning by the X galvanometer mirror 14a in a first direction of the reciprocating scanning is referred to as "outward route scanning" and scanning by the same in a second direction opposed to the first direction is referred to as "inward route scanning".

A pupil projection lens 15, a mirror 16, an image formation lens 17 and an objective lens 18 for forming a light spot on the sample 2 are arranged on the scanning optical path from the X/Y galvanometer mirrors 14a and mirrors 14b to the sample 2.

The fluorescence emitted from the sample 2 proceeds in the reverse direction of the illuminating optical path (namely, the direction from the objective lens 18 to the image formation lens 17, the mirror 16, the pupil projection lens 15, and the X/Y galvanometer mirrors 14a and mirrors 14b) and passes through the excitation dichroic mirror 13 to enter a confocal lens 19.

A confocal pinhole 20 is arranged at an image formation position of the confocal lens 19. The confocal pinhole 20 has a structure the inner diameter of which can be adjusted without restraint (complete control of opening and closing). The confocal pinhole 20 is driven by a diameter drive mechanism 21 consisting of, e.g., a motor mechanism. The diameter drive mechanism 21 performs control to adjust the diameter of the confocal pinhole 20 to an optimum pinhole diameter in accordance with a wavelength of each fluorescence emitted from the sample 2 when the sample 2 is irradiated with each excitation laser beam having an excitation wavelength of, e.g., 488 nm, 543 nm, or 633 nm (control concerning opening/closing. This will be simply referred to as "control" hereinafter).

A spectral dichroic mirror 22 is arranged on the optical path of the fluorescence (detected light) having passed through the confocal pinhole 20. The spectral dichroic mirror 22 has a characteristic for separating, for example, a fluorescence having a wavelength shorter than a wavelength of 570 nm (fluorescence acquired by excitation of the excitation wavelength 488 nm) and a fluorescence having a wavelength longer than a wavelength of 570 nm (fluorescence acquired by excitation of the excitation wavelength of 543 nm or 633 nm).

A first photodetector 24 is arranged on the reflection optical path (fluorescence having a wavelength shorter than the wavelength 570 nm) of the spectral dichroic mirror 22 through a barrier filter 23 for setting an area of a fluorescence having a desired wavelength by cutting the reflected light of the laser beam. A second photodetector 26 is arranged on a transmission optical path (fluorescence having a wavelength longer than the wavelength 570 nm) of the spectral dichroic mirror 22 through a barrier filter 25 for setting an area of a fluorescence having a desired wavelength by cutting the reflected light of the laser beam.

Upon receiving an execution command from a computer 28, a control section 27 executes the following function. (1) A function for selecting the Ar laser device 3, the HeNe-G laser device 4 or the HeNe-R laser device 5 from the laser unit 1. (2) A function for driving the X/Y galvanometer mirrors 14a and mirrors 14b for scanning. (3) A function for controlling a pinhole diameter of the confocal pinhole 20. (4) A function for distinguishing a signal by a fluorescent dye F1 fetched from the first photodetector 24 and a signal by a fluorescent dye Cy5 fetched from the second photodetector 26 by using different colors. (5) A function for displaying one multi-dye fluorescent image on, e.g., a monitor.

A computer 28 has a function for causing an observer to give an observation start command to a control section 27.

Description will now be given as to an image acquisition method by using a scanning optical microscope having the structure mentioned above.

Here, a method for observing two types of fluorescences in the time division manner. Specifically, a fluorescence according to a fluorescent dye FITC is detected in the outward route scanning and a fluorescence according to a fluorescent dye Cy5 is detected in the inward route scanning by the X galvanometer mirror 14a.

The outline of this observation method is as described below. A fluorescence according to the fluorescent dye FITC at each pixel position on one line is detected by a first photodetector 24 in the outward route scanning and a fluorescence according to the fluorescent dye Cy5 at each pixel position on the same line as the one line in the outward route is detected by a second photodetector 26 in the inward route scanning by using the X galvanometer mirror 14a. Here, scanning for one line is completed. Upon completing scanning for one line, the light spot is then shifted by one scanning line in the vertical direction on the sample 2 by the Y galvanometer mirror mirrors 14b, and scanning for one line is similarly carried out as described above. The above-mentioned operation is repeated until detection of a detection range is terminated.

The specific operation when executing the above observation method from the computer 28 will now be described with reference to FIG. 3.

When an execution command is issued from the computer 28 to the control section 27, the control section 27 first receives the execution command from the computer (step S1). The control section 27 makes judgment upon whether scanning using the X/Y galvanometer mirrors 14a and mirrors 14b is carried out in the outward route or the inward route (step S2). If it is the outward route scanning, the control section 27 issues a command for selecting an excitation laser beam of the Ar laser device 3 to the acousto-optic device 9 of the laser unit 1 (step S3).

Here, the acousto-optic device 9 selects the excitation laser beam having the excitation wavelength of 488 nm outputted from the Ar laser device 3 among the Ar laser device 3, the HeNe-G laser device 4 and the HeNe-R laser device 5 and leads the selected laser beam to the single-mode fiber 10.

At the same time, the control section 27 issues to the diameter drive mechanism 27 a command for controlling a pinhole diameter of the confocal pinhole 20 to 100 μm which is an optimum diameter for the fluorescence having a central wavelength of 520 nm emitted from the fluorescent dye FITC when the sample 2 is irradiated with the excitation wavelength 488 nm (step S4). As a result, the pinhole diameter of the confocal pinhole 20 is controlled to 100 μm diameter which is optimum for the central wavelength 520 nm of the fluorescence of the fluorescent dye FITC.

The excitation laser beam having the excitation wavelength of 488 nm is led to the scanning unit 11 through the single-mode fiber 10. The excitation laser beam is then formed into a parallel beam by the collimator lens 12, reflected by the excitation dichroic mirror 13, and scanned by the X/Y galvanometer mirrors 14a and mirrors 14b. Further, the excitation laser beam is transmitted through the pupil projection lens 15, reflected downwards by the mirror 16, and imaged as a light spot on the sample 2 through the image formation lens 17, the objective lens 18 and others. At this time, the light spot is used for scanning in the outward route in the horizontal direction on the sample 2.

The fluorescence having the central wavelength of 520 nm by the fluorescent dye FITC generated when the sample 2 is scanned by using the light spot of the laser beam proceeds in a direction opposite to the illumination optical path, namely, proceeds from the objective lens 18 to the image formation lens 17, the mirror 16, the pupil projection lens 15, and X/Y galvanometer mirrors 14a and mirrors 14b and enters the confocal lens 19 through the excitation dichroic mirror 13. The fluorescence is condensed by the confocal lens 19 and imaged on the confocal pinhole 20.

At this moment, the diameter of the confocal pinhole 20 is controlled to the diameter of 100 μm which is optimum for the central wavelength 520 nm of the fluorescence of the fluorescent dye FITC. Further, the fluorescence of the fluorescent dye FITC transmitted through the confocal pinhole 20 is reflected by the spectral dichroic mirror 22. Its unnecessary laser reflected light is cut by the barrier filter 23 and only the fluorescence of the FITC enters the first photodetector 24.

The control section 27 fetches a signal from the first photodetector 24. At this time, the control section 27 prevents the second photodetector 26 from electrically measuring the detected light so as not to detect a leaked light which is transmitted through the spectral dichroic mirror 22 (step S5).

Furthermore, the control section 27 fetches a signal from the first photodetector 24 in accordance with each pixel during the outward route scanning in the horizontal direction by the X galvanometer mirror 14a.

When the outward route scanning by the X galvanometer mirror 14a is finished and the inward route scanning is started, the control section 27 issues a command for selecting the excitation laser beam of the HeNe-R laser device 5 to the acousto-optic device 9 of the laser unit 1, selects and outputs the excitation laser beam having the excitation wavelength of 633 nm from the HeNe-R laser device 5 so that the selected excitation laser beam is led to the single-mode fiber 10 (step S6).

At the same time, the control section 27 issues to the diameter drive mechanism 21 a command for controlling the pinhole diameter of the confocal pinhole 20 to 130 μm which is an optimum diameter of the fluorescence having the central wavelength of 670 nm emitted from the fluorescent dye Cy5 when the sample 2 is irradiated with the excitation wavelength of 633 nm (step S7). As a result, the pinhole diameter of the confocal pinhole 20 is controlled to the diameter of 130 μm which is optimum for the central wavelength 670 nm of the fluorescence of the fluorescent dye Cy5.

The excitation laser beam having the excitation wavelength of 633 nm is led to the scanning unit 11 through the single-mode fiber 10. The excitation laser beam is then formed into a parallel light by the collimator lens 12, reflected by the excitation dichroic mirror 13, and scanned by the X/Y galvanometer mirrors 14a and mirrors 14b. This excitation laser beam is further transmitted through the pupil projection lens 15, reflected downwards by the mirror 16, and imaged as a light spot on the sample 2 through the image formation lens 17, the objective lens 18 and others. At this time, the light spot is used for scanning in the inward route in the horizontal direction on the sample 2.

The fluorescence having the central wavelength of 670 nm by the fluorescent dye Cy5 generated when scanned on the sample 2 in this manner proceeds in a direction opposite to the illumination optical path, namely, proceeds from the objective lens 18 to the image formation lens 17, the mirror 16, the pupil projection lens 15, and the X/Y galvanometer mirrors 14a and mirrors 14b, is transmitted through the excitation dichroic mirror 13 and enters the confocal lens 19. Moreover, the fluorescence is condensed by the confocal lens 19 and imaged on the confocal pinhole 20.

At this time, the diameter of the confocal pinhole 20 is controlled to the diameter of 130 μm which is optimum for the central wavelength of 670 nm of the fluorescence of the fluorescent dye Cy5, and the fluorescence of the fluorescent dye Cy5 transmitted through the confocal pinhole 20 is transmitted through the spectral dichroic mirror 22. Its unnecessary laser reflected light is cut by the barrier filter 25, and only the fluorescence of Cy5 enters the second photodetector 26.

The control section 27 fetches a signal from the second photodetector 26. At this moment, the control section 27 prevents the first photodetector 24 from electrically measuring the detected light so as not to detect a leaked light reflected on the spectral dichroic mirror 22 (step S8).

This control section 27 fetches a signal from the second photodetector 26 in accordance with each pixel during the inward route scanning in the horizontal direction by the X galvanometer mirror 14a.

Then, when the outward and inward route scanning by the X galvanometer mirror 14a is completed, the control section 27 makes judgment upon whether the horizontal scanning line by the X galvanometer mirror 14a has reached a last line (step S9).

If the horizontal scanning line has reached the last line in the step S9, the processing is terminated. However, if it is determined that the horizontal scanning line has not reached the last line in the step S9, the light spot on the sample 2 is shifted by one scanning line in the vertical direction by the Y galvanometer mirror mirrors 14b (step S10).

Thereafter, the operation from the step S2 to the step S10 is repeated till the detection operation in the detection range is terminated.

Subsequently, the control section 27 separates the signal according to the fluorescent dye FITC fetched from the first photodetector 24 and the signal according to the fluorescent dye Cy5 fetched from the second photodetector 26 by using different colors and displays them as one multi-dye fluorescent light image on, e.g., a monitor.

As described above, in the first embodiment, the laser waveform of 488 nm is selected in the outward route scanning by the X galvanometer mirror 14a, and the diameter of the confocal pinhole is controlled to 100 μm which is optimum for the fluorescence according to the fluorescent light dye FITC. Further, the laser wavelength of 633 nm is selected in the inward route scanning, and the diameter of the confocal pinhole is controlled to 130 μm which is optimum for the fluorescence according to the fluorescent dye Cy5. That is, when the respective fluorescences according to the two types of fluorescent dyes FITC and Cy5 are detected for one image in the time division manner, the pinhole diameter of the confocal pinhole 20 can be controlled to the dimension which is optimum for each fluorescent light wavelength. Therefore, there occurs no cross talk in the two types of fluorescences, and the optimum confocal effects can be obtained in accordance with each fluorescence to be detected.

Although the unit of time division for acquiring the respective fluorescences of the fluorescent dyes FITC and Cy5 is the unit of line in the first embodiment, scanning may be carried out for two frames in one image acquisition for example, and time division may be performed in accordance with each frame. In this case, in the first frame scanning, the laser wavelength, the confocal pinhole diameter and setting of the photodetector are switched and controlled so as to acquire the fluorescence of the FITC, and the fluorescence of the FITC is obtained by the first photodetector 24. Then, in the next frame scanning, the laser wavelength, the confocal pinhole diameter and setting of the photodetector are controlled so as to acquire the fluorescence of the Cy5, and the fluorescence of the Cy5 is obtained by the second photodetector 26.

During scanning of one pixel, the two fluorescences may be subjected to time division and detected. In this case, when detecting one pixel, the laser waveform, the confocal pinhole diameter, and setting of the photodetector are first controlled so as to acquire the fluorescence of the fluorescent dye FITC, and the fluorescence of the FITC is obtained by the first photodetector 24. Then, the laser wavelength, the confocal pinhole diameter, and setting of the photodetector are switched so as to acquire the fluorescence of the Cy5, and the fluorescence of the Cy5 is obtained by the second photodetector 26. Additionally, in all pixels, the fluorescences of the fluorescent dyes FITC and Cy5 are detected. In this modification in which the two fluorescences are switched and acquired in one pixel, the time lag produced when acquiring the two fluorescences can be greatly reduced as compared with the time division detection for each frame scanning or the time division detection in the outward route and the inward route using the X galvanometer mirror 14a.

In the above-described first embodiment, although detection is carried out in both the outward route scanning and the inward route scanning. However, scanning may be carried out twice on the same line only in one direction so that the fluorescence of the FITC is acquired in the first outward route scanning and the fluorescence of the Cy5 is obtained in the second outward route scanning.

A second embodiment according to the present invention will now be described with reference to the accompanying drawings. It is to be noted that same reference numerals as those in FIG. 2 denote like or corresponding parts, thereby omitting the detailed description.

FIG. 4 is a block diagram showing a scanning optical microscope according to the second embodiment of the present invention. The scanning optical microscope according to the second embodiment omits the spectral dichroic mirror 22, the barrier filter 23 and the first photodetector 24 in the first embodiment, and uses only one photodetector (second photodetector in the first embodiment) 26 in order to acquire the two fluorescences. It is to be noted that a barrier filter 31 substitutes for the barrier filter 25.

The barrier filter 31 has a characteristic for cutting both the two excitation wavelengths 488 nm and 633 nm and causing two fluorescent light wavelength regions corresponding to the fluorescent dyes FITC and Cy5 to pass. Further, the barrier filter 31 may be configured so as to switch two types of barrier filters, i.e., a barrier filter for FITC having a characteristic for cutting the excitation wavelength 488 nm and causing the fluorescent light wavelength of the fluorescent dye FITC to pass, and a barrier filter for Cy5 having a characteristic for cutting the excitation wavelength 633 nm and causing the fluorescent light wavelength of the fluorescent dye Cy5 to pass by an electric motor-driven type mechanism in synchronization with switching of the excitation wavelengths for exciting the respective fluorescences.

Figure 5:
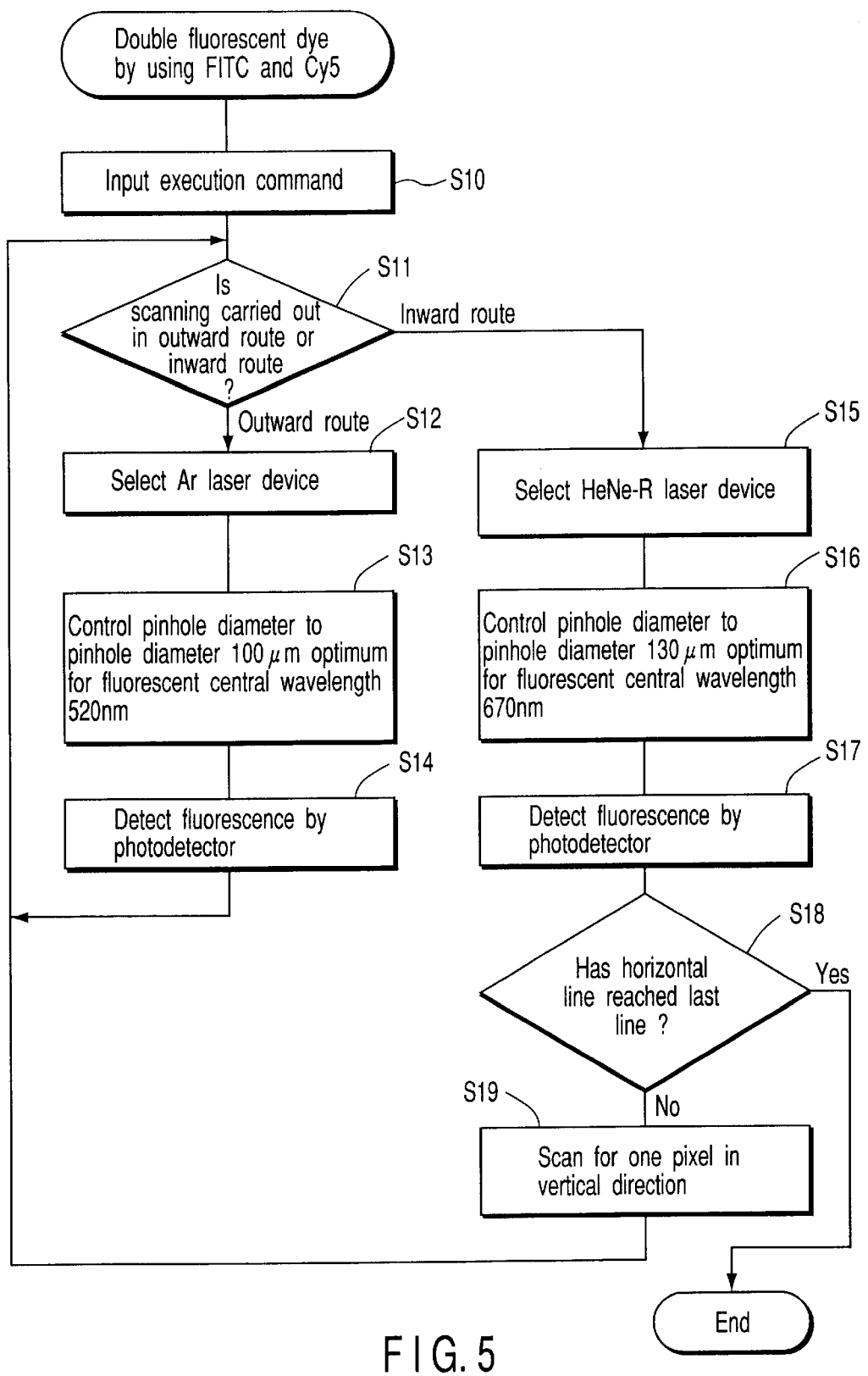
FIG. 5 is an image acquisition control flowchart according to the second embodiment of the scanning optical microscope according to the present invention.

An image acquisition method by using the scanning optical microscope configured as described above will now be described with reference to an image acquisition control flowchart shown in FIG. 5.

Figure 3:
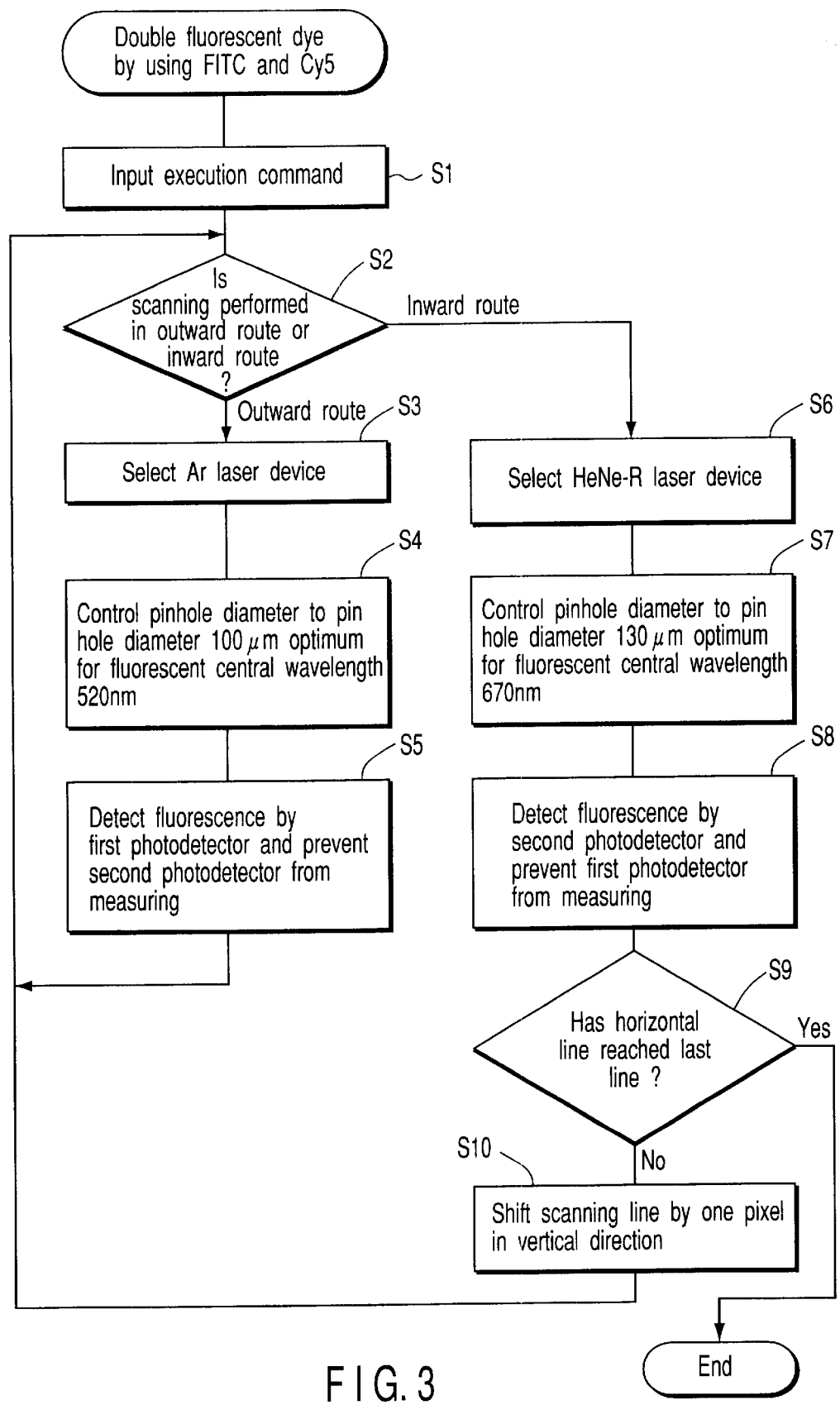
FIG. 3 is an image acquisition control flowchart in the first embodiment of the scanning optical microscope according to the present invention.

The control after issue of an execution command from the computer 28 to the control section 27 till the pinhole diameter in the outward route scanning in the X galvanometer mirror 14a is controlled to 100 μm which is optimum for the fluorescence having the central wavelength 520 nm (step S11 to Step S13) is the same as the control from the step S2 to the step S4 in FIG. 3, thereby omitting the explanation.

The control section 27 fetches a signal from the photodetector 26 as a signal of the fluorescence of the fluorescent dye FITC and accumulates it in a non-illustrated memory section (step S14). The control section 27 fetches a signal from the photodetector 26 in accordance with each pixel during the outward route scanning in the horizontal direction by the X galvanometer mirror 14a.

The control till the pinhole diameter in the inward route scanning by the X galvanometer mirror 14a is controlled to 130 μm which is optimum for the fluorescence having the central wavelength 670 nm (step S11, step S15 and step S16) is the same as those in the step S2, the step S6 and the step S7 in FIG. 3, respectively, thereby omitting the explanation.

The control section 27 fetches a signal from the photodetector 26 as a signal of the fluorescent light of the fluorescent dye Cy5 and accumulates it in a non-illustrated memory section (step S17). This control section 27 fetches a signal from the photodetector 26 in accordance with each pixel during the inward scanning in the horizontal direction by the X galvanometer mirror 14a.

Upon completing the outward and inward route scanning by the X galvanometer mirror 14a, the control section 27 makes judgment upon whether the horizontal scanning line by the X galvanometer mirror 14a has reached a last line (step S18).

If the horizontal scanning line has reached the last line in the step S18, the processing is terminated. However, if it is determined that the horizontal scanning line has not reached the last line in the step S18, the light spot on the sample 2 is scanned for one pixel in the vertical direction by the Y galvanometer mirror mirrors 14b, and the scanning line is shifted by one line (step S19).

Thereafter, the operation from the step S11 to the step S19 is repeated till the detection operation in the detection range is completed. Then, the control section 27 separates the signal by the fluorescent dye FITC and the signal by the fluorescent dye Cy5 by using different colors, and displays them as one multi-dye fluorescent image on, e.g., a monitor.

As described above, according to the second embodiment, in addition to the effects in the first embodiment, it is possible to cut back one photodetector.

A third embodiment according to the present invention will now be described with reference to the accompanying drawings. Since the structure of the third embodiment is the same as that of the second embodiment, illustration and description are omitted.

In the third embodiment, description will be given as to a method for acquiring three fluorescences during scanning of one pixel in the time division manner. Incidentally, in the third embodiment, detection of the fluorescence having the central wavelength 590 nm by excitation using the excitation laser beam having the excitation wavelength 543 nm with respect to the sample 2 dyed with a fluorescent dye PI will be explained in addition to the first and second embodiments. At this time, the pinhole diameter of the confocal pinhole 20 which is optimum for the fluorescence with respect to the fluorescent dye PI is as follows:

| Confocal pinhole diameter | = 1.22 · λ/NA |
| | = 1.22 · 0.59/0.0063 |
| | = 114 μm |

It is to be noted that NA of the fluorescence incident upon the confocal pinhole 20 is determined as NA=0.0063 as similar to the case of the fluorescent dyes FITC and Cy5 described in the first and second embodiments.

In this case, the control section 27 has the following function. That is, in case of acquiring an image of the sample 2 triple-dyed with the fluorescent dyes FITC, PI and Cy5, the excitation laser beam of the Ar laser device 3, the excitation laser beam of the HeNe-G laser device 4, and the excitation laser beam of the HeNe-R laser device 5 are sequentially selected from the laser unit 1. In synchronization with selection of these excitation laser beams, the pinhole diameter of the confocal pinhole 20 is controlled to the pinhole diameters 100 μm, 114 μm and 130 μm which are optimum for the fluorescent wavelengths according to the respective fluorescent dyes. At the same time, signals from the detector 26 are fetched as signals by the fluorescent dye FITC, the fluorescent dye PI and the fluorescent dye Cy5 in synchronization with selection of these excitation laser beams and accumulated in non-illustrated memory sections according to the fluorescent dye FITC, the fluorescent dye PI and the fluorescent dye Cy5. These operations are effected for all pixels while performing scanning using the X/Y galvanometer mirrors 14a and mirrors 14b. Further, the respective signals by the fluorescent dyes FITC, PI and Cy5 accumulated in accordance with each pixel are distinguished by using different colors and displayed as one multi-dye fluorescent image on, e.g., a monitor.

The barrier filter 31 arranged in front of the photodetector 26 has a characteristic for cutting all of three excitation wavelengths 488 nm, 543 nm and 633 nm and causing three fluorescent light wavelength regions corresponding to the fluorescent dyes FITC, PI and Cy5 to pass. The barrier filter 31 may be configured so as to switch three types of barrier filters, i.e., a barrier filter for FITC having a characteristic for cutting the excitation wavelength 488 nm and causing the fluorescent light wavelength of the fluorescent dye FITC to pass, a barrier filter for PI having a characteristic for cutting the excitation wavelength 543 nm and causing the fluorescent light wavelength of the fluorescent dye PI to pass, and a barrier filter for Cy5 having a characteristic for cutting the excitation wavelength 633 nm and causing the fluorescent light wavelength of the fluorescent dye Cy5 to pass by an electric motor-driven type mechanism in synchronization with the detection time of each fluorescence.

Figure 6:
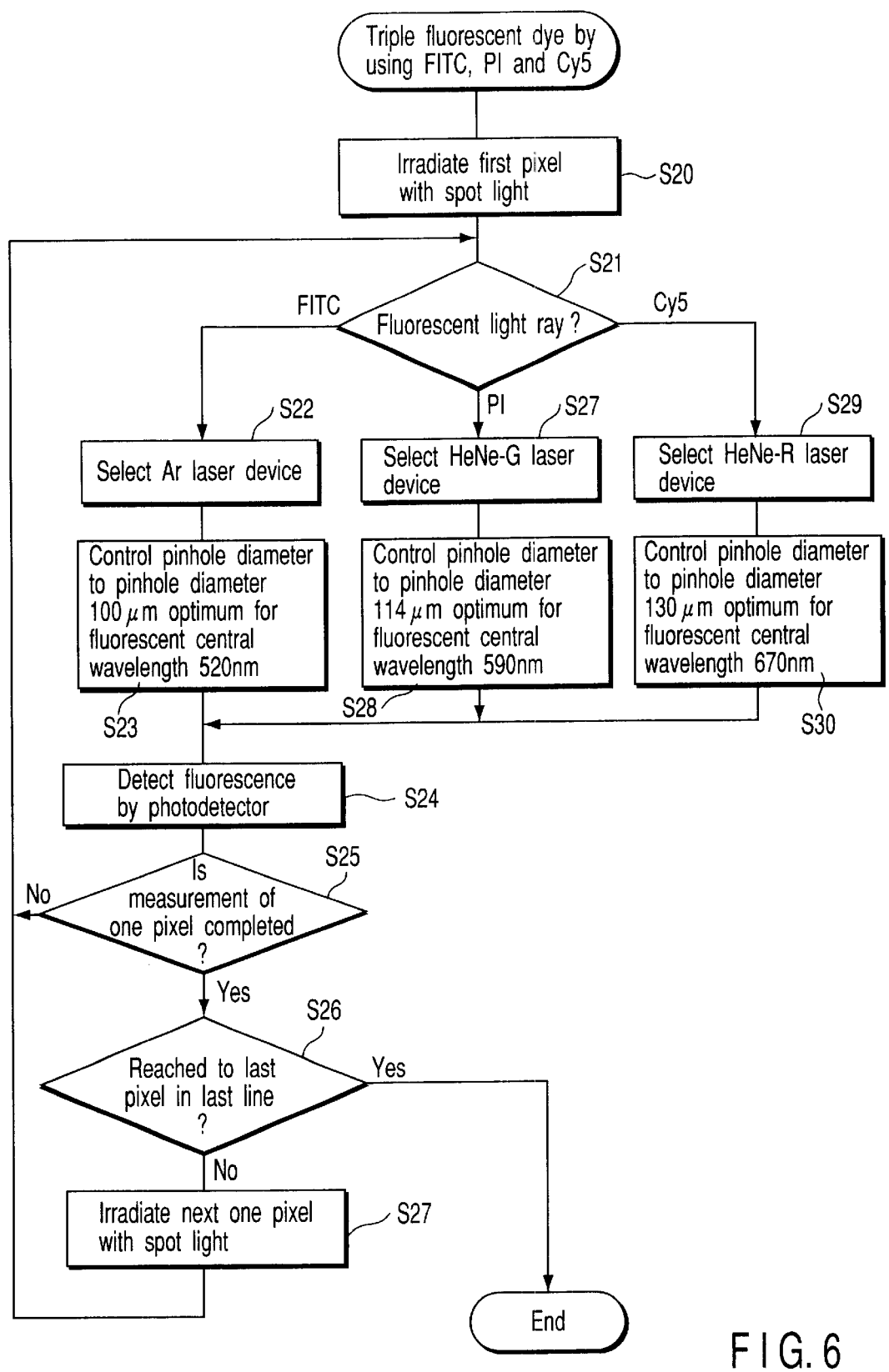
FIG. 6 is an image acquisition control flowchart according to a third embodiment of a scanning optical microscope according to the present invention.

An image acquisition method by using the scanning optical microscope having the above-described structure will now be described with reference to an image acquisition control flowchart shown in FIG. 6. Incidentally, measurement is carried out with respect to the three fluorescent dyes FITC, PI and Cy5 in the order of FITC, PI and Cy5 in the following explanation.

When an execution command is issued from the computer 28 to the control section 27, the control section 27 drives and moves the X/Y galvanometer mirrors 14a and mirrors 14b so that the spot light is imaged on one point on the sample 2 according to first one pixel. The control section 27 then fixes the X/Y galvanometer mirrors 14a and mirrors 14b (step S20).

The control section 27 determines the fluorescence to be measured (step S21). Here, measurement is conducted with respect to the three types of the fluorescent dyes FITC, PI and Cy5 in the order of FITC, PI and Cy5. Therefore, a selection command is issued to the acousto-optic device 9 of the laser unit 1 in order to select the excitation laser beam of the Ar laser device 3, and the excitation laser beam having the excitation wavelength 488 nm is outputted from the Ar laser device 3 (step S22).

At the same time, the control section 27 issues to the diameter drive mechanism 21 a command for controlling the pinhole diameter of the confocal pinhole 20 to 100 μm which is an optimum diameter which can be calculated from the central wavelength 520 nm of the fluorescence of the fluorescent dye FITC when the sample 2 is irradiated with the excitation laser beam having the excitation wavelength 488 nm (step S23). As a result, the pinhole diameter of the confocal pinhole 20 can be controlled to the diameter of 100 μm which is optimum for the central wavelength 520 nm of the fluorescence of the fluorescent dye FITC.

The excitation laser beam having the excitation wavelength 488 nm is led to the scanning unit 11 through the single-mode fiber 10, and imaged as a light spot on the sample 2 through the collimator lens 12, the excitation dichroic mirror 13, the X/Y galvanometer mirrors 14a and mirrors 14b, the pupil projection lens 15, the mirror 16, the image formation lens 17, the objective lens 18 and others.

The fluorescence having the central wavelength 520 nm according to the fluorescent dyes FITC from the sample 2 proceeds in a direction opposite to the illumination optical path, enters the confocal lens 19, and imaged on the confocal pinhole 20.

At this time, since the confocal pinhole 20 is controlled to the diameter of 100 μm which is optimum for the fluorescence having the central wavelength 520 nm according to the fluorescent dye FITC, the fluorescence passes through the confocal pinhole 20 and enters the photodetector 26 through the barrier filter 31.

The control section 27 fetches a signal from the photodetector 26 as a signal of the fluorescence of the fluorescent dye FITC and accumulates it in a non-illustrated memory section according to the fluorescent dye FITC (step S24).

Subsequently, the control section 27 makes judgment upon whether detection of the respective fluorescences of the three types of fluorescent dyes FITC, PI and Cy5 is completed with respect to one pixel. If detection of all of the three types of the fluorescences is not completed, the processing returns to the step S21 and the fluorescent dye to be subsequently subjected to fluorescent light measurement, namely, PI or Cy5 in this example is determined (step S25).

As a result of this determination, the control section 27 shifts from the step S21 to the step S27. The control section 27 issues a selection command to the acousto-optic device 9 of the laser unit 1 on the same pixel and causes this device to select the excitation laser beam of the HeNe-G laser device 4 so that the excitation laser beam having the excitation wavelength 543 nm is outputted from the HeNe-G laser device 4 (step S27).

At the same time, the control section 27 issues to the diameter drive mechanism 21 a command for controlling the pinhole diameter of the confocal pinhole 20 to 114 μm which is an optimum diameter for the central wavelength 590 nm according to the fluorescent dye PI when the sample 2 is irradiated with the excitation laser beam having the excitation wavelength 543 nm (step S28). As a result, the pinhole diameter of the confocal pinhole 20 is controlled to 114 μm which is optimum for the central wavelength 590 nm of the fluorescence of the fluorescent dye PI.

The excitation laser beam having the excitation wavelength 543 nm is led to the scanning unit 11 through the single-mode fiber 10, and imaged as a light spot on the sample 2 through the collimator lens 12, the excitation dichroic mirror 13, the X/Y galvanometer mirrors 14a and mirrors 14b, the pupil projection lens 15, the mirror 16, the image formation lens 17, the objective lens 18 and others.

The fluorescence having the central wavelength 590 nm according to the fluorescent dye PI from the sample 2 proceeds in a direction opposite to the illumination optical path, enters the confocal lens 19, and is imaged on the confocal pinhole 20.

At this time, since the confocal pinhole 20 is controlled to the diameter of 114 μm which is optimum for the fluorescence having the central wavelength 590 nm according to the fluorescent dye PI, the fluorescence passes through this confocal pinhole 20 and enters the photodetector 26 through the barrier filter 31.

The processing advances to the step S24, and the control section 27 fetches a signal from the photodetector 26 as a signal of a fluorescence of the fluorescent dye PI and accumulates it in a non-illustrated memory section according to the fluorescent dye PI.

Again in the step S25, the control section 27 then makes judgment upon whether detection of the respective fluorescences of the three types of the fluorescent dyes FITC, PI and Cy5 is completed with respect to one pixel. If detection of all of the three types of the fluorescences is not completed, the processing returns to the step S21 and determines the fluorescent dye to be subsequently subjected to the fluorescent light measurement, namely, Cy5 in this example.

As a result of this determination, the control section 27 shifts from the step S21 to the step S29. The control section 27 issues a selection command to the acousto-optic device 9 of the laser unit 1 on the same pixel and causes this device to select the excitation laser beam of the HeNe-R laser device 5 so that the excitation laser beam having the excitation wavelength 633 nm is outputted from the HeNe-R laser device 5 (step S29).

At the same time, the control section 27 issues to the diameter drive mechanism 21 a command for controlling the pinhole diameter of the confocal pinhole 20 to 130 μm which is a diameter optimum for the fluorescence having the central wavelength 670 nm according to the fluorescent dye Cy5 when the sample 2 is irradiated with the excitation laser beam having the excitation wavelength 633 nm (step S30). As a result, the pinhole diameter of the confocal pinhole 20 can be controlled to the diameter of 130 μm which is optimum for the central wavelength 670 nm of the fluorescence of the fluorescent dye Cy5.

The excitation laser beam having the excitation wavelength 633 nm is led to the scanning unit 11 through the single-mode fiber 10, and imaged as a light spot on the sample 2 through the collimator lens 12, the excitation dichroic mirror 13, the X/Y galvanometer mirrors 14a and mirrors 14b, the pupil projection lens 15, the mirror 16, the image formation lens 17, the objective lens 18 and others.

The fluorescence having the central wavelength 670 nm according to the fluorescent dye Cy5 from the sample 2 proceeds in a direction opposite to the illumination optical path, enters the confocal lens 19 and is imaged on the confocal pinhole 20.

At this moment, since the confocal pinhole 20 is controlled to the diameter of 130 μm which is optimum for the fluorescent light having the central wavelength 670 nm according to the fluorescent dye Cy5, the fluorescence passes through the confocal pinhole 20 and enters the photodetector 26 through the barrier filter 31.

At the step S24, the control section 27 fetches a signal from the photodetector 26 as a signal of the fluorescent light of the fluorescent dye Cy5 and accumulates it in a non-illustrated memory section according to the fluorescent dye Cy5.

Then, again at the step S25, the control section 27 makes judgment upon whether detection of the respective fluorescences of the three types of fluorescent dyes FITC, PI and Cy5 is completed with respect to one pixel. If detection of all of the three types of fluorescences is completed, the processing proceeds to the next step S26, and judgment is made upon whether the pixel scanned by the X galvanometer mirror 14a or the X/Y galvanometer mirrors 14a and mirrors 14b has reached a last pixel.

If it is determined that the scanned pixel has reached the last pixel in the last line at the step S26, the processing is completed. However, if the scanned pixel has not reached the last pixel in the last line, the processing advances to the next step S27, the spot light is fixedly emitted by the X galvanometer mirror 14a or the X/Y galvanometer mirrors 14a and mirrors 14b in accordance with next each one pixel.

Thereafter, as similar to the above description, the spot light is fixedly emitted by the X/Y galvanometer mirrors 14a and mirrors 14b in accordance with each one pixel, and the diameter of the confocal pinhole is controlled to 100 μm in order to detect the fluorescence according to the fluorescent dye FITC. Then, the diameter of the confocal pinhole is controlled to 114 μm in order to detect the fluorescence according to the fluorescent dye PI, and the diameter of the confocal pinhole is subsequently controlled to 130 μm in order to detect the fluorescence according to the fluorescent dye Cy5. Further, the operation for accumulating the signals according to the fluorescent dyes FITC, PI and Cy5 in each non-illustrated memory section is carried out with respect to all the pixels.

Then, the control section 27 distinguishes the signal according to the fluorescent dye FITC, the signal according to the fluorescent dye PI and the signal according to the fluorescent dye Cy5 by using different colors, and displays them as one multi-dye fluorescent image on, e.g., a monitor.

As described above, according to the third embodiment, the pinhole diameter of the confocal pinhole 20 which is optimum for each of the fluorescent light wavelengths of the three types of fluorescent dyes FITC, PI and Cy5 can be set by using one photodetector 26, and the signal for each of the three types of fluorescent light wavelengths can be acquired in the time division manner. Moreover, there occurs no cross talk in all of the three types of fluorescences, and the optimum confocal effect can be obtained.

According to the third embodiment, for example, the three types of fluorescent dyes FITC, PI and Cy5 are sequentially switched and their fluorescences are acquired. However, switching of these fluorescent dyes FITC, PI and Cy5 is not restricted to a particular order, and they may be randomly switched. In addition, the present invention is not restricted to the three types of fluorescent dyes FITC, PI and Cy5, and any other fluorescent dye may be used.

Although switching of the respective excitation wavelengths is carried out in units of the reciprocating scanning of the excitation laser beam (units of each line), units of a frame or units of one pixel in the first to third embodiments, the present invention is not restricted thereto, and the excitation wavelengths can be switched with any timing as long as switching is synchronized with scanning of the excitation laser beam.

In the first to third embodiments, the pinhole diameter of the confocal pinhole 20 is switched (changed) in accordance with each wavelength of the fluorescence in order to acquire a confocal image which is optimum for each fluorescence. Besides, it is possible to adopt a structure for, e.g., reflecting the fluorescence emitted from the sample by a mirror instead of passing the fluorescence. Such an embodiment will now be described hereinafter.

Figure 1:
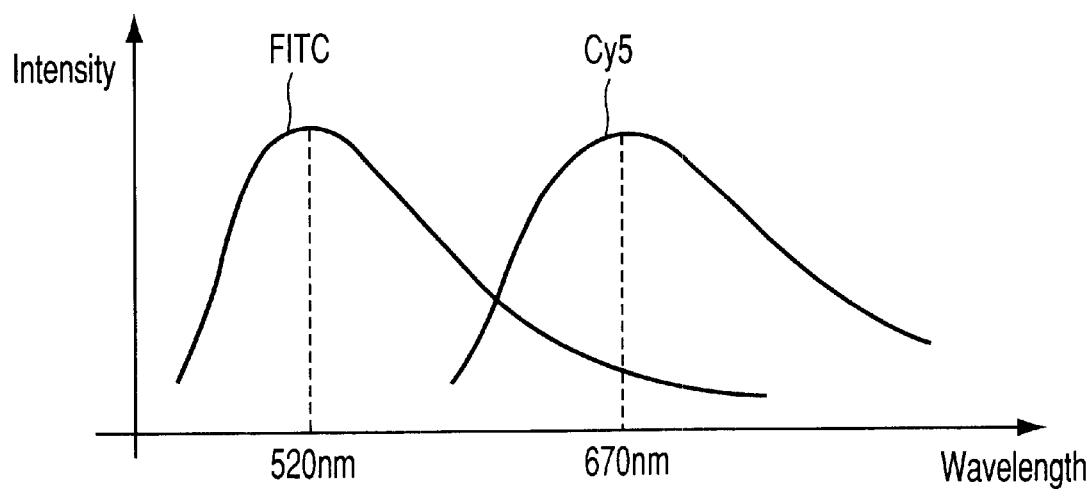
FIG. 1 is a view showing cross talk of a fluorescence from a sample dyed with each fluorescent reagent.
Figure 7:
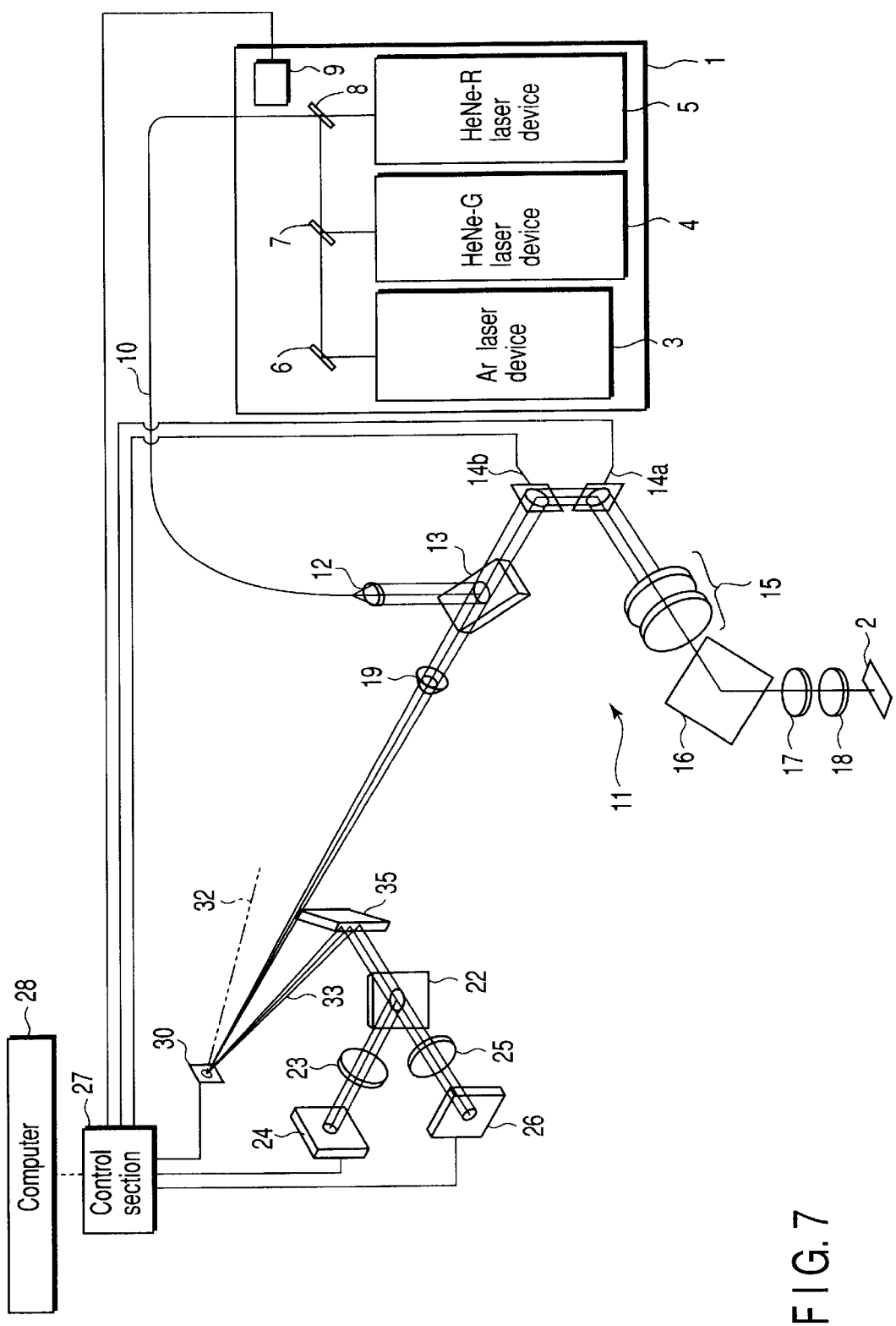
FIG. 7 is a block diagram showing a fourth embodiment of a scanning optical microscope according to the present invention.

FIG. 7 is a block diagram showing a scanning optical microscope of a fourth embodiment according to the present invention. In FIG. 7, like reference numerals denote parts similar to those in FIG. 1, thereby omitting the detailed explanation. In this embodiment, a minute deflecting mirror array 30 is arranged in place of the confocal pinhole 20 in FIG. 2.

Figure 8:
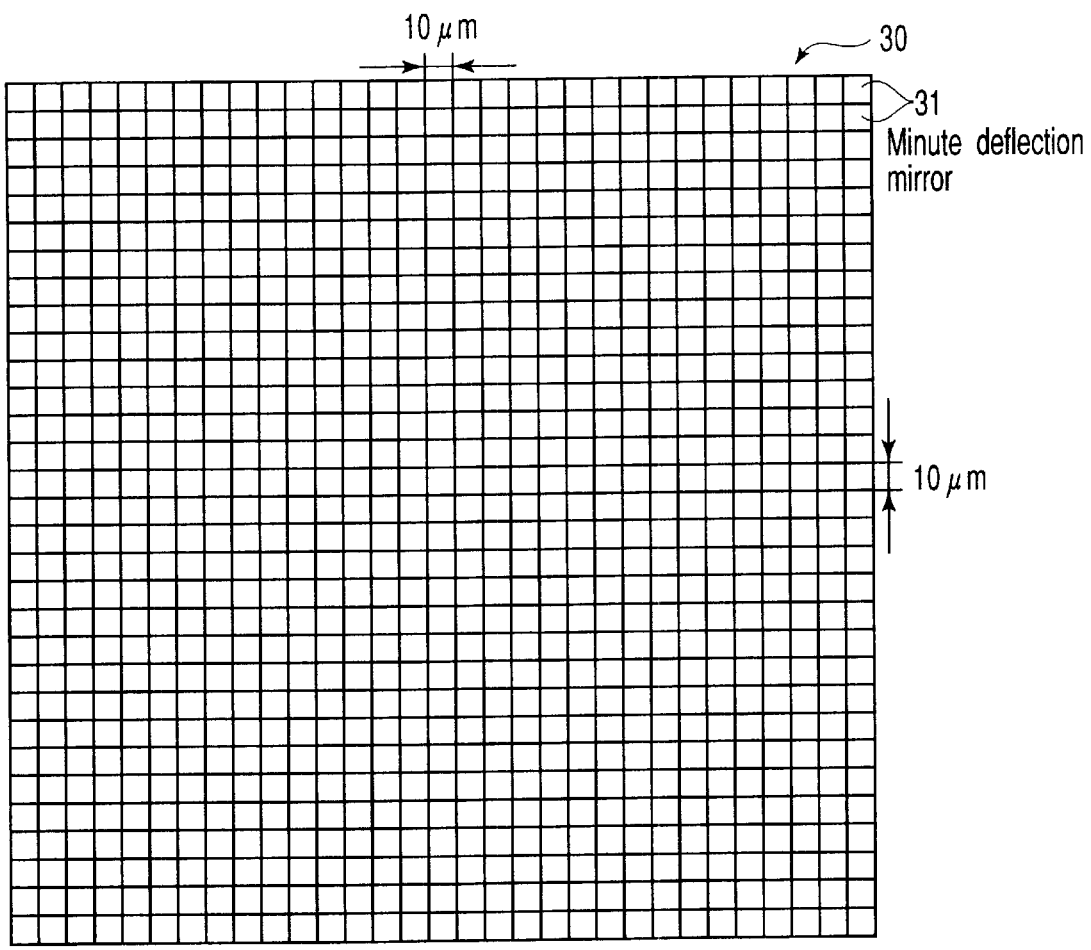
FIG. 8 is a block diagram of a minute deflecting mirror array in the fourth embodiment of the scanning optical microscope according to the present invention.

That is, in the fourth embodiment, the minute deflecting mirror array 30 as a minute device group is arranged at an image formation position of the confocal lens 19, i.e., a position conjugated with the sample 2 through the confocal lens 19. This minute deflecting mirror array 30 effectively restricts a diffraction diameter and has the same function as the confocal pinhole 20 in the first and second embodiments. This minute deflecting mirror array 30 has a structure in which a plurality of minute deflecting mirrors 31 are arranged in the two-dimensional matrix form as shown in FIG. 8, and an angle of each minute deflecting mirror 31 can be varied without restraints.

An angle of the minute deflecting mirror 31 is controlled by, e.g., on/off switching of an electromagnet or deformation of an electrostriction device. This minute deflecting mirror array 30 is manufactured by a semiconductor process using, e.g., a semiconductor material. As to the dimension of each minute deflecting mirror 31, this mirror is formed into a square of approximately 10 μm×10 μm. In this minute deflecting mirror array 30, a filling ratio of the minute deflecting mirrors 31 aligned in the matrix form is not less than 90%.

In this minute deflecting mirror array 30, an angle of each minute deflecting mirror 31 in a light area of the fluorescent light spot is controlled in such a manner that the fluorescent light spot from the sample 2 formed by image formation of the confocal lens 19 is reflected on the optical path 33 on the arrangement direction side of the first and second photodetectors 24 and 26. Incidentally, in this minute deflecting mirror array 30, each minute deflecting mirror 31 outside the light area of the fluorescent light spot is controlled to an angle different from that of each minute deflecting mirror 31 in the light area of the fluorescent light spot, and its reflection direction is, for example, a optical path 32.

On the optical path 33 of the fluorescence reflected by the minute deflecting mirror array 30, a reflecting mirror 35 is arranged, and a spectral dichroic mirror 22 is arranged on the reflection optical path of this reflecting mirror 35. This spectral dichroic mirror 22 has a characteristic for separating a fluorescence having a wavelength shorter than a wavelength 570 nm (fluorescence acquired by excitation of the excitation wavelength 488 nm) and a fluorescence having a wavelength longer than a wavelength 570 nm (fluorescence acquired by excitation of the excitation wavelength 543 nm or 633 nm), for example. This structure following this dichroic mirror 22 is similar to the first embodiment, omitting the explanation.

The control section 27 has a function of: selecting the Ar laser device 3, HeNe-G laser device 4 or HeNe-R laser device 5 from the laser unit 1; driving the X/Y galvanometer mirrors 14a and mirrors 14b for scanning; distinguishing a signal outputted from the first photodetector 24 which has fetched the fluorescence from, e.g., the fluorescent dye FITC and a signal outputted from the second photodetector 26 which has fetched the fluorescence from, e.g., the fluorescent dye Cy5 by using different colors; and displaying them as one multi-dye fluorescent image on, e.g., one monitor.

Further, the control section 27 controls an angle of each minute deflecting mirror 31 in the light area of the fluorescent light spot in the minute deflecting mirror array 30 so as to reflect the fluorescence from the sample 2 on the optical path 33 parallel to the arrangement direction of the first and second photodetectors 24 and 26. Furthermore, the control section 27 controls an angle of each minute deflecting mirror 31 so as to reflect an angle of each minute deflecting mirror 31 outside the light area of the fluorescent light spot on the optical path 32 different from the arrangement direction of the first and second photodetectors 24 and 26.

Description will now be given as to the effect of the scanning optical microscope having the above-described structure. It is to be noted that only differences from the first embodiment will be explained in the following description.

When the sample 2 is scanned by selecting the Ar laser device 3, the fluorescence having the central wavelength 520 nm according to the fluorescent dye FITC is generated, and this fluorescence proceeds in a path similar to that in the first embodiment and enters the confocal lens 19. Then, the fluorescence is condensed by the confocal lens 19 and imaged as a light spot on the minute deflecting mirror array 30.

The control section 27 selects the Ar laser device 3, and controls an angle of each minute deflecting mirror 31 in the light area of the fluorescent light spot imaged in the minute deflecting mirror array 30 so as to reflect the fluorescence from the sample 2 on the optical path 33 which is the arrangement direction of the first and second photodetectors 24 and 26. The control section 27 controls an angle of each minute deflecting mirror 31 so as to reflect an angle of each minute deflecting mirror 31 outside the light area of the fluorescent light spot on the optical path 32 different from the arrangement direction of the first and second photodetectors 24 and 26.

Here, it is assumed that NA of the fluorescence condensed from the confocal lens 19 onto the minute deflecting mirror array 30 is 0.0063, and the fluorescent dye FITC is excited by the laser beam having the excitation wavelength 488 nm and generates the fluorescence having the fluorescent light wavelength 520 nm. Then, the dimension (diffraction diameter) $\phi D$ of the light spot on the minute deflecting mirror array 30 can be obtained by calculating the following formula:

$$\phi D = 1.22 \cdot \lambda/NA = 1.22 \times 0.52/0.0063 \approx 100 \, \mu m$$

Figure 9:
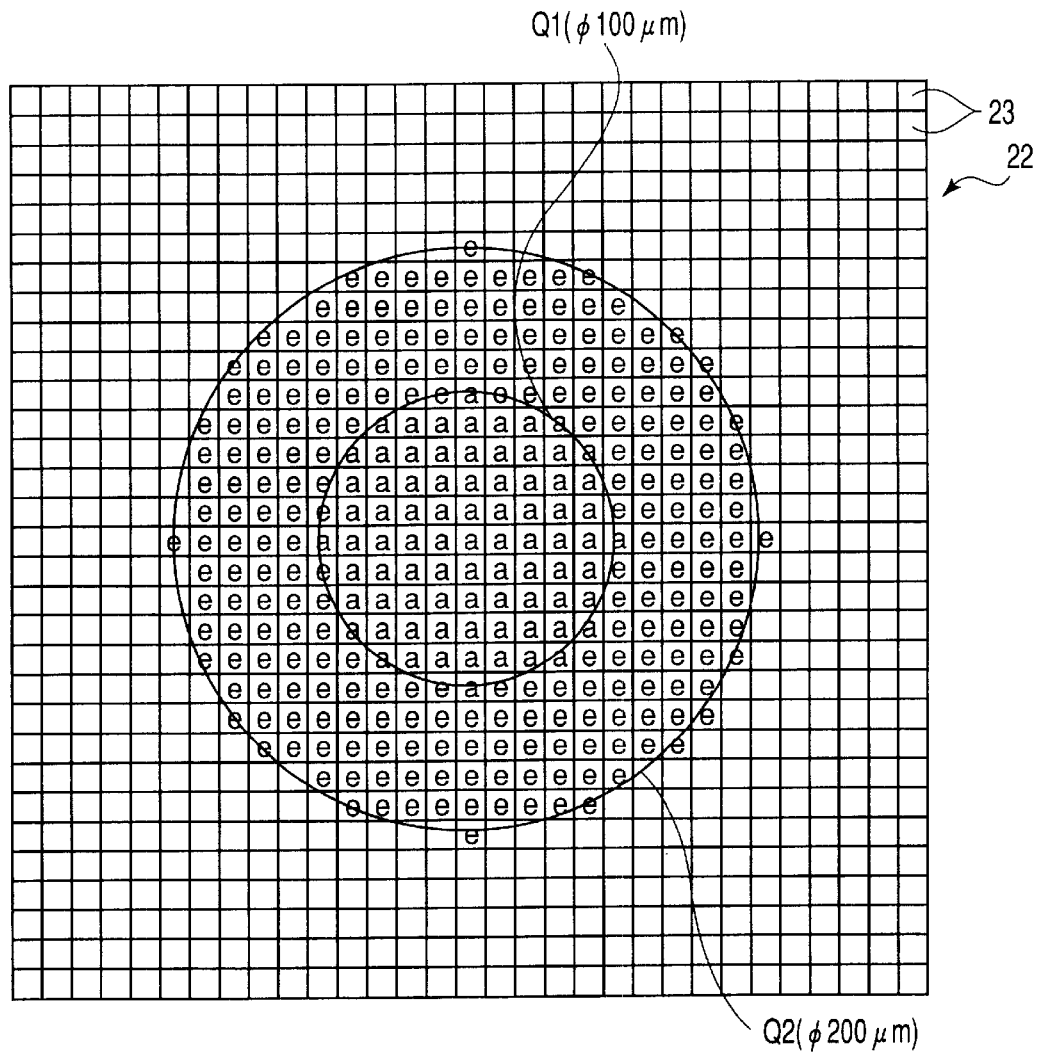
FIG. 9 is a view showing the angle control of each minute deflecting mirror in a light area in which fluorescences are imaged in the minute deflecting mirror array in the fourth embodiment of the scanning optical microscope according to the present invention.

Therefore, the control section 27 controls an angle of each minute deflecting mirror 31 within the diffraction diameter $\phi D \approx 100 \, \mu m$ (within an area Q1 in FIG. 9) of the fluorescent light spot to be imaged which is obtained by calculating the above formula on the minute deflecting mirror array 30 as shown in FIG. 9. Moreover, the control section 27 controls each minute deflecting mirror 31 in such a manner that the fluorescence from the sample 2 reflected on these minute deflecting mirrors 31 proceeds on the optical path 33 in the arrangement direction of the first or second photodetector 24 or 26. It is to be noted that "a" denotes each minute deflecting mirror 31 within the area Q1 in FIG. 9.

Besides, the control section 27 controls an angle of each minute deflecting mirror 31 outside the area Q1 in the minute deflecting mirror array 30 to an angle different from that of each minute deflecting mirror 31 within the area Q1, and controls each minute deflecting mirror 31 in such a manner that the light reflected on these minute deflecting mirrors 31 proceeds on the optical path 32 deviated from the arrangement direction of the first or second photodetector 24 or 26.

Figure 10:
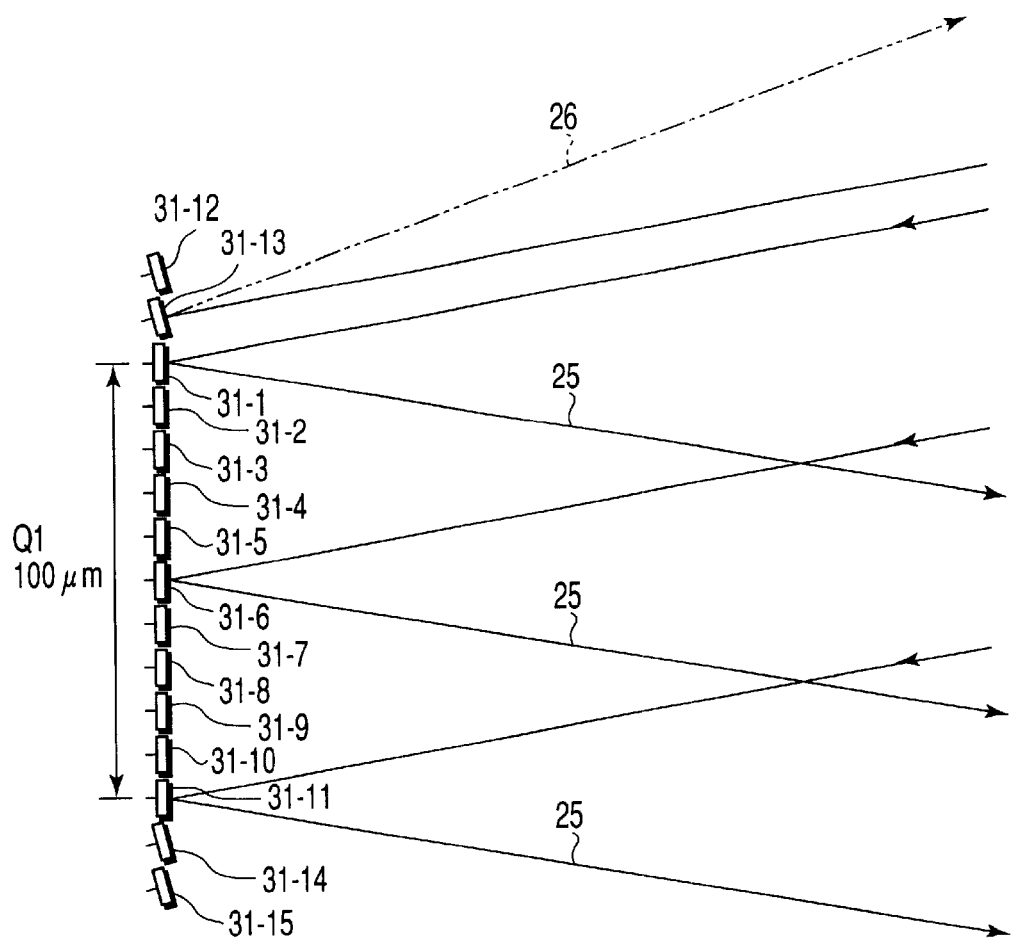
FIG. 10 is a side view showing paths of fluorescences incident upon each minute deflecting mirror in a plane on which fluorescences are reflected in the fourth embodiment of the scanning optical microscope according to the present invention.

FIG. 10 is a side cross-sectional view showing the path of the fluorescent spot light imaged on each minute deflecting mirror 31 within a plane on which the fluorescence is reflected. Angles of the respective minute deflecting mirrors 31-1 to 31-11 in the diffraction diameter (in the area Q1) $\phi D$ ($\approx 100 \, \mu m$) of the light spot are controlled in a direction along which the fluorescent light spot proceeds on the optical path 33, and angles of the respective minute deflecting mirrors 31-12 to 31-15 outside the diffraction diameter $\phi D$ of the light spot are controlled in a direction along which the light proceeds on the optical path 32.

By setting the angle of each minute deflecting mirror 31 in the minute deflecting mirror array 30 having the above-described arrangement, the fluorescent light spot from a focusing surface of the sample 2 is reflected on the respective minute deflecting mirrors 31-1 to 31-11 within the diffraction diameter $\phi D$ of the light spot and proceeds on the optical path 33. Moreover, it is reflected on the reflecting mirror 35 and enters the spectral dichroic mirror 22. As a result, the minute deflecting mirror array 30 serves as a reflecting type confocal pinhole.

Besides, the light reflected on the respective minute deflecting mirrors 31-12 to 31-15 other than the minute deflecting mirrors 31-1 to 31-11, namely, the light from a surface deviated from the focusing surface of the sample 2 (de-focusing surface) does not enter the first or second photodetector 24 or 26.

The fluorescence of the fluorescent dye FITC which has entered the spectral dichroic mirror 22 is reflected here and its unnecessary laser reflected light is cut by the barrier filter 23. Thus, only the fluorescence of the FITC enters the first photodetector 24.

The control section 27 fetches a signal from the first photodetector 24 and finally acquires a fluorescent image of the sample 2.

On the other hand, when increase in the confocal pinhole diameter is desired in favor of the brightness even though the confocal effect is sacrificed to some extent, for example, when it is desired to set the confocal pinhole diameter to 200 $\mu m$ which is twice as large as the diffraction diameter $\phi D$ ($\approx 100 \, \mu m$), the angle of each minute deflecting mirror 31 within the area Q2 is controlled as shown in FIG. 9 so that the fluorescence from the sample 2 reflected on these minute deflecting mirrors 31 can proceed on the optical path 33 in the arrangement direction of the first or second photodetector 24 or 26. That is, the angles of the respective minute deflecting mirrors "a" or "e" are controlled in a direction along which the fluorescence proceeds on the optical path 33.

By setting the angle of each minute deflecting mirror 31 in such a minute deflecting mirror array 30, the fluorescent light spot from the focusing surface of the sample 2 is reflected on each minute deflecting mirror 31 within Q2 (=200 $\mu m$) and proceeds on the optical path 33. In addition, this fluorescent light spot is reflected on the reflecting mirror 35 and enters the spectral dichroic mirror 22. As a result, the minute deflecting mirror array 30 serves as a reflecting type confocal pinhole.

Besides, the light reflected on each minute deflecting mirror 31 outside Q2 (=200 $\mu m$) proceeds on the optical path 32 and does not enter the first or second photodetector 24 or 26.

The fluorescence of the fluorescent dye FITC which has entered the spectral dichroic mirror 22 is reflected here, and its unnecessary laser reflected light is cut by the barrier filter 23. Thus, only the fluorescence of the FITC enters the first photodetector 24.

The control section 27 fetches a signal from the first photodetector 24 and finally acquires a fluorescent image of the sample 2.

In the fourth embodiment, the minute deflecting mirror array 30 in which a plurality of the minute deflecting mirrors 31 are arranged in the two-dimensional matrix form is arranged at a position conjugated with the sample 2 and, in this minute deflecting mirror array 30, the angle of each minute deflecting mirror 31 within the diffraction diameter φD of the fluorescent light spot is controlled so as to reflect the fluorescence in the arrangement direction of the first and second photodetectors 24 and 26, whilst the angle of each minute deflecting mirror 31 outside the diffraction diameter φD of the fluorescent light spot is controlled to be an angle different from that of each minute deflecting mirror 31 within the diffraction diameter φD of the light spot. Therefore, the mechanical transmission unit using as a source of power a motor and the like for switching the dimension of the confocal pinhole diameter is substituted by angle switching of the minute deflecting mirror array 30 manufactured by the semiconductor process, and mechanical abrasion of the driving section does not occur. Additionally, it is possible to realize increase in speed of diameter correction of means for effectively restricting the diffraction diameter.

Incidentally, the dimension of each minute deflecting mirror 31 is 10 μm×10 μm in the fourth embodiment. However, when reducing the light intensity loss due to a gap between the respective minute deflecting mirrors 31 as much as possible, it is good enough to set the focal length of the confocal lens 19 longer to increase the light spot on the minute deflecting mirror array 30 and increase the dimension of each minute deflecting mirror 31. If the dimension of the gap between the respective minute deflecting mirrors 31 is fixed, increase in size of each minute deflecting mirror 31 can improve the efficiency of use of the light intensity.

A fifth embodiment according to the present invention will now be described. It is to be noted that the structure of the scanning optical microscope is the same as that in FIG. 7, thereby omitting illustration and description.

Figure 11:
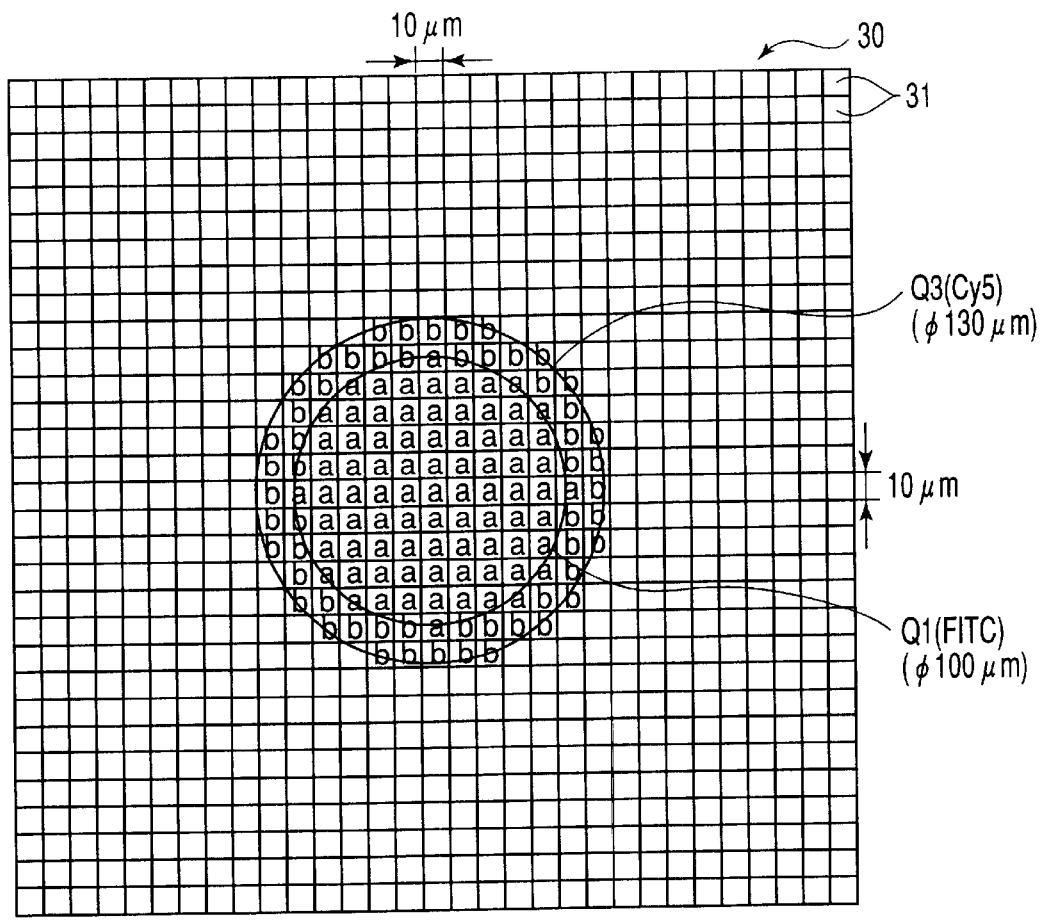
FIG. 11 is a view showing the angle control of each minute deflecting mirror in a light area in which fluorescences are imaged in a minute deflecting mirror array in a fifth embodiment of a scanning optical microscope according to the present invention.

As to the dimension of the light spot in this example as described in FIG. 11, it is good enough that the fluorescence reflected on a part indicated by "a" enters the detector when measuring the fluorescence having the central wavelength 520 nm emitted from the fluorescent dye FITC and the fluorescence reflected on parts indicated by "a" and "b" enters the detector when measuring the fluorescence having the central wavelength 670 nm emitted from the fluorescent dye Cy5.

As described above, according to the fifth embodiment, as similar to the fourth embodiment, the mechanical transmission unit using as a source of power a motor and the like for switching the dimension of the confocal pinhole diameter is substituted by angle switching of the minute deflecting mirror array 30, and the mechanical abrasion of the driving section does not occur. Further, it is possible to realize increase in speed of diameter correction of means for restricting the effective range of the diffraction diameter. Furthermore, as similar to the first embodiment, when observing the sample 2 double-fluorescent-dyed with the fluorescent dyes FITC and Cy5, an image of the FITC is acquired by the first photodetector 24 and an image of the Cy5 is acquired by the second photodetector 26 by switching scanning in the outward route and the inward route by the X galvanometer mirror 14a. Therefore, cross talk of the two types of fluorescences can be prevented from occurring, and an optimum diffraction diameter can be set with each fluorescent light wavelength.

It is to be noted that a scanning frequency of the X galvanometer mirror 14a is fast, i.e., 500 Hz. Furthermore, it is desirable to carry out the set range of the minute deflecting mirror array 30 in each of the outward route and the inward route, namely, the time for switching the areas Q1 and Q2 shown in FIG. 11 at 100 μsec or lower which is sufficiently faster than the one-way scanning time 1 msec for one line in the horizontal direction.

Since each minute deflecting mirror 31 has very small mass and rarely has the inertia, it can accurately deal with this switching speed. It is to be noted that each minute deflecting mirror 31 can sufficiently cope with the electrically switching speed of the first and second photodetectors 24 and 26.

The fifth embodiment can be modified as follows.

Although detection is performed by the first and second photodetectors 24 and 26 in accordance with each fluorescent light wavelength, the two fluorescences may be acquired by any one of the first and second photodetectors 24 and 26. According to this method, a detection signal from any one of the photodetectors, for example, the first photodetector 24 is processed in the time sharing manner in the control section 27. That is, the detection signal in the outward route in the horizontal scanning by the X galvanometer mirror 14a is processed as an optical signal of the fluorescent dye FITC, and the detection signal in the inward route is processed as an optical signal of the fluorescent dye Cy5, thereby realizing the modification of the above embodiment.

As described above, when the two fluorescences are acquired in the time division manner in the control section 27 and the detection signals from the photodetectors are subjected to signal processing by dividing the detection time for each fluorescence of each of the fluorescent dyes FITC and Cy5, one photodetector substitutes for a plurality of the photodetectors, and the photodetectors can be cut back. In this case, the barrier filter to be used is provided with a characteristic for cutting the two excitation wavelengths 488 nm and 633 nm and transmitting the wavelengths through the both fluorescent light wavelength regions of the fluorescent dyes FITC and Cy5.

Alternatively, in the fifth embodiment, an image of the fluorescent dye FITC is acquired in the outward route of the X galvanometer mirror 14a performing scanning in the horizontal direction, and an image of the fluorescent dye Cy5 is acquired in the inward route of the same. However, a difference in time of approximately 1 msec is produced between the two types of acquired fluorescent images. If this difference in time is a problem, switching between the fluorescent dyes FITC and Cy5 may be carried out during scanning of one pixel (one point) instead of the horizontal line. That is, this is setting required for observation of each of the fluorescent dyes FITC and Cy5. It is good enough to carry out switching by the acousto-optic device 9 for selecting the excitation wavelength, angle control of each minute deflecting mirror 31 within the diffraction diameter φD according to the fluorescent light wavelength in the minute deflecting mirror array 30, and switching of the first or second photodetector 24 or 26 for preventing the detector which does not effect detection from electrically measuring during scanning of one pixel according to one light spot in the process of scanning on the sample 2.

According to the fifth embodiment in which the above-described modifications are combined, since the two types of fluorescent wavelengths can be obtained in the time division manner during acquisition of one image and the optimum diffraction diameter (φD) according to each fluorescent light wavelength can be set, there occurs no fluorescent light cross talk and the same confocal effect can be obtained in accordance with each wavelength.

A sixth embodiment according to the present invention will now be described. Incidentally, like reference numerals denote the same parts as those in FIG. 7, thereby omitting the detailed explanation.

Figure 12:
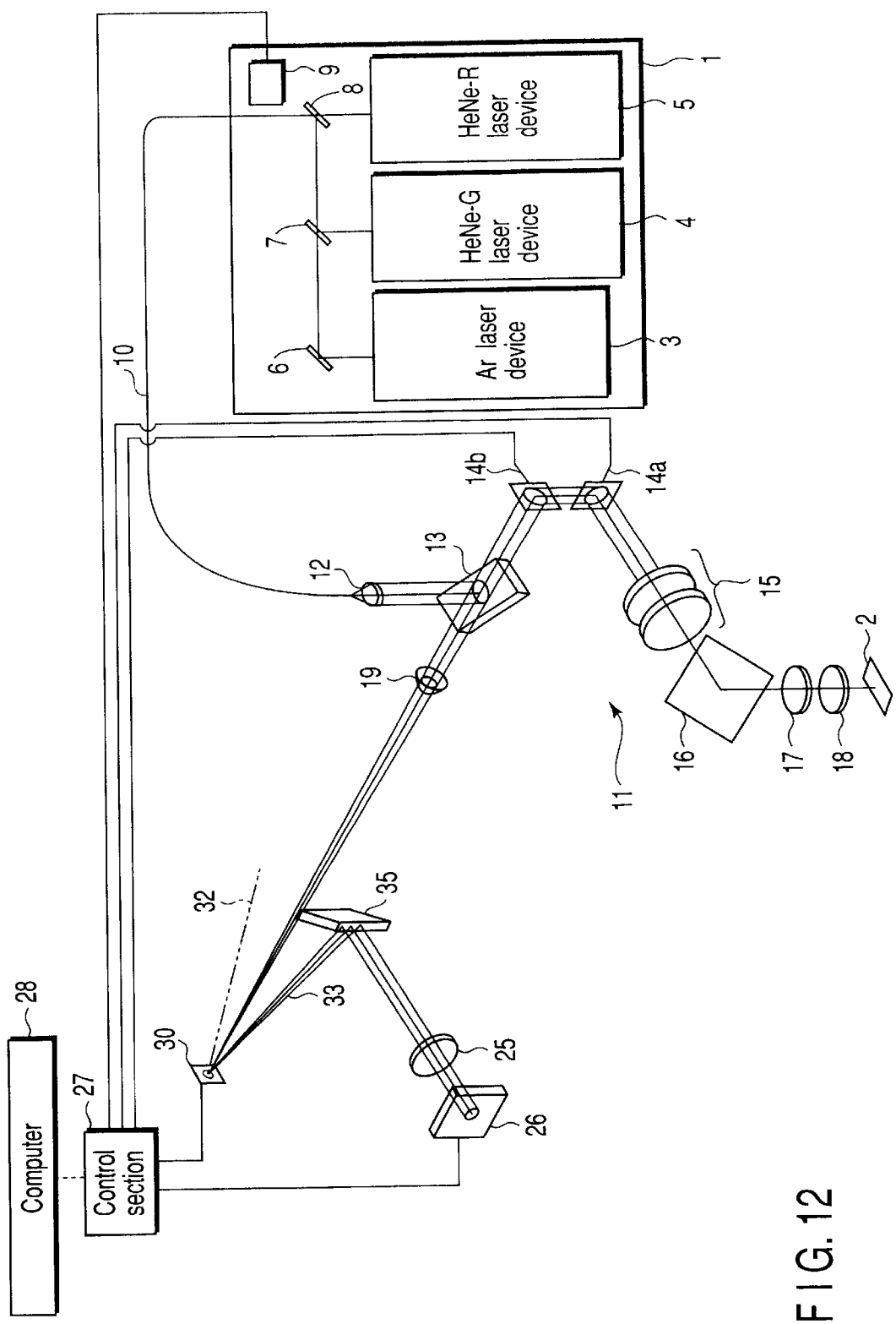
FIG. 12 is a block diagram showing a sixth embodiment of a scanning optical microscope according to the present invention.

FIG. 12 is a block diagram showing a scanning optical microscope according to a sixth embodiment of the present invention. This scanning optical microscope acquires three fluorescences of the fluorescent dyes FITC, PI and Cy5 by one photodetector 24 in the time division manner. The sixth embodiment substitutes the minute deflecting mirror array 30 for the confocal pinhole 20 in the second embodiment. In the sixth embodiment, description will be given as to the case of acquisition of an image of the sample 2 triple-dyed with the fluorescent dyes FITC, PI and Cy5.

The control section 27 has a function of performing in accordance with each pixel: the angle control of each minute deflecting mirror 31 within the diffraction diameter φD (≈100 μm) of the fluorescent spot light by the fluorescent dye FITC in the minute deflecting mirror array 30 when the Ar laser device 3 is first selected from the laser unit 1; the angle control of each minute deflecting mirror 31 within the diffraction diameter φD (≈114 μm) of the fluorescent spot light by the fluorescent pixel PI in the minute deflecting mirror array 30 when the HeNe-G laser device 4 is then selected; and the angle control of each minute deflecting mirror 31 within the diffraction diameter φD (≈130 μm) of the fluorescent spot light by the fluorescent dye Cy5 in the minute deflecting mirror array 30 when subsequently selecting the HeNe-R laser device 5.

Furthermore, the control section 27 fetches and accumulates a signal from the photodetector 24 as a signal by the fluorescent dye FITC; then fetches and accumulates a signal from the photodetector 24 as a signal by the fluorescent dye PI; and thereafter fetches and accumulates a signal from the photodetector 24 as a signal by the fluorescent dye Cy5 in synchronization with selection of the Ar laser device 3, the HeNe-G laser device 4 or the HeNe-R laser device 5. Moreover, the control section 27 performs these operations with respect to all the pixels while scanning using the X/Y galvanometer mirrors 14a and mirrors 14b. Then, the control section 27 distinguishes the respective signals by the fluorescent dyes FITC, PI and Cy5 accumulated in accordance with each pixel by using different colors, and displays them as one multi-dye fluorescent image on, e.g., a monitor.

It is to be noted that the barrier filter 25 arranged in front of the photodetector 24 is the same as one which has been described in connection with the third embodiment.

According to the sixth embodiment, as similar to the fourth embodiment, the mechanical transmission unit using as a source of power a motor and the like for switching the dimension of the confocal pinhole diameter is substituted for angle switching of the minute deflecting mirror array 30 manufactured by the semiconductor process, and the mechanical abrasion of the driving section does not occur. Moreover, it is possible to realize increase in speed for diameter correction of means for restricting the effective range of the diffraction diameter. In addition, when observing the sample 2 triple-fluorescent-dyed with the fluorescent dyes FITC, PI and Cy5, the optimum diffraction diameter can be set in accordance with each fluorescent light wavelength relative to each of these fluorescent dyes FITC, PI and Cy5 and its multi-dye fluorescent image can be acquired.

A seventh embodiment according to the present invention will now be described. It is to be noted that like reference numerals denote the same parts as those in FIG. 7, thereby omitting the detailed explanation.

Figure 13:
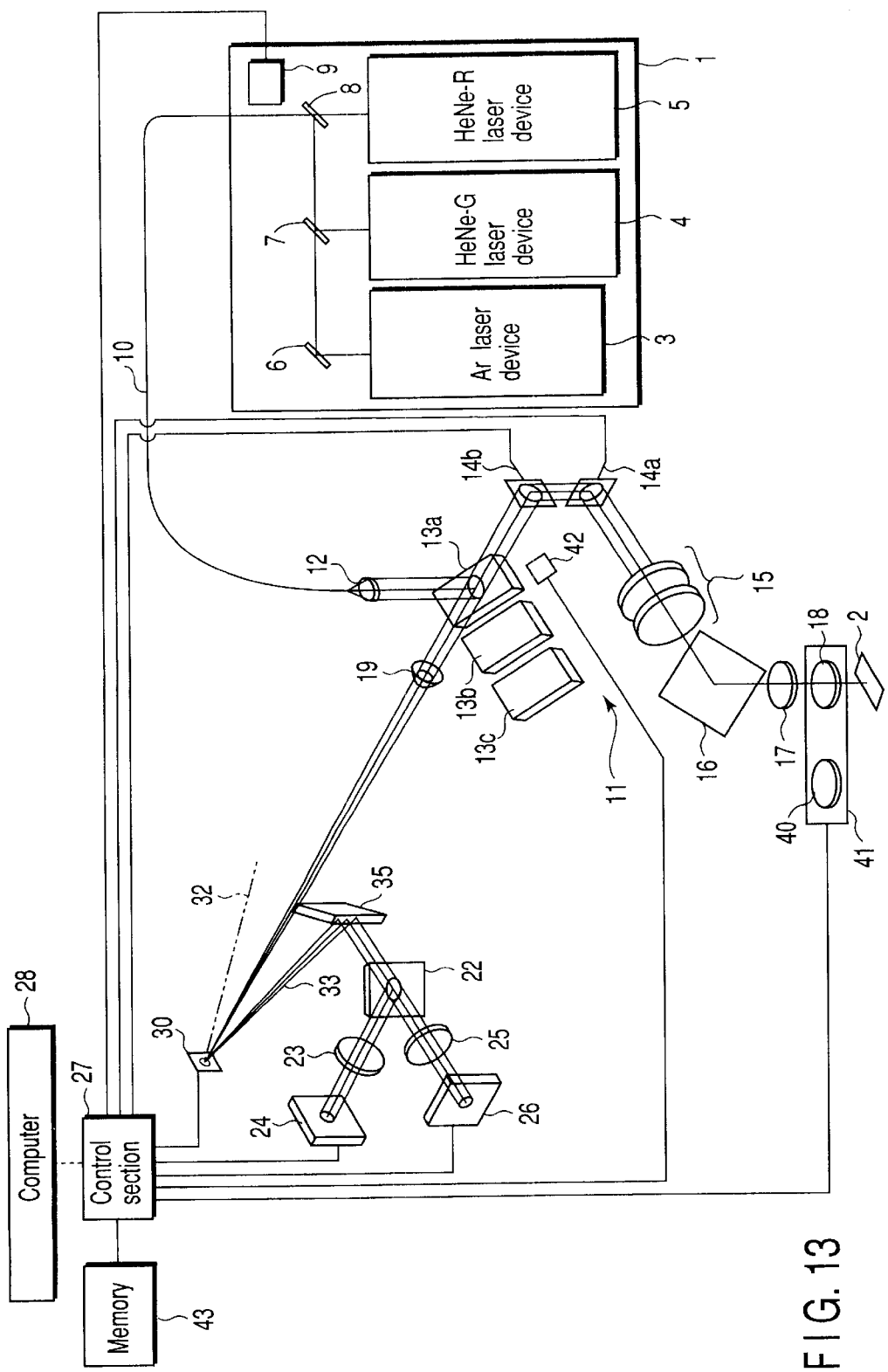
FIG. 13 is a block diagram showing a seventh embodiment of a scanning optical microscope according to the present invention.

FIG. 13 is a block diagram showing a scanning optical microscope according to the seventh embodiment of the present invention. This scanning optical microscope is provided with a first function of angle control of each minute deflecting mirror 31 within the diffraction diameter φD of the fluorescent spot light in the minute deflecting mirror array 30 when switched to the objective lens 18 or 40, and a second function for correcting the displacement of the light spot on the minute deflecting mirror array 30 caused due to each mounting angle error when the excitation dichroic mirror 13a is switched to the excitation dichroic mirror 13b or 13c having another wavelength characteristic.

The objective lenses 18 and 40 have different magnifications B and numerical aperture NA. The present invention is not restricted to these objective lenses, and there are prepared multiple objective lenses having different magnifications B and numerical aperture NA.

An objective lens switching mechanism 41 has a function for switching the objective lens 18 or 40, arranging it in the optical axis, and informing the control section 27 of a type of the switched objective lens 18 or 40.

The excitation dichroic mirror switching sensor 42 has a function for detecting the excitation-dichroic mirror 13a, 13b or 13c arranged in the fluorescent optical path by the switching operation of the respective excitation dichroic mirror 13a, 13b or 13c and transmitting its detection signal to the control section 27.

When the control section 27 is informed of a type of the switched objective lens 18 or 40 from the objective lens switching mechanism 41, the control section 27 functions to calculate the diffraction diameter φD of the light spot in the minute deflecting mirror array 30 based on the fluorescent light wavelength to be observed, the magnification B and numerical aperture NA of the switched objective lens 18 or 40.

Assuming that the fluorescent light wavelength to be observed is λ, the focal length of the confocal lens 19 is Fc, the focal length of the pupil projection lens 15 is Fp, the magnification of each of the objective lens 18 or 40 is B, and numerical aperture is NA, the diffraction diameter φD of the light spot can be obtained by calculating the following expression (and so forth in this embodiment):

$$\phi D = 1.22 \times (B \cdot Fc \cdot \lambda)/(NA \cdot Fp)$$

Therefore, the control section 27 has a function for controlling an angle of each minute deflecting mirror 31 within the diffraction diameter φD of the light spot calculated by the above expression in the minute deflecting mirror array 30 so that the fluorescence from the sample 2 is reflected on the optical path 33 which is an arrangement direction of the first and second photodetectors 24 and 26, and controlling an angle of each minute deflecting mirror 31 so that an angle of each minute deflecting mirror 31 outside the diffraction diameter φD of the light spot is reflected on the optical path 32 different from the arrangement direction of the first and second photodetectors 24 and 26, when switched to the objective lens 18 or 40.

It is to be noted that in the memory 43 is stored data of the fluorescent light wavelength λ, the focal length Fc of the confocal lens 19, the focal length Fp of the pupil projection lens 15, the magnification B and the numerical aperture NA of each of the objective lenses 18 and 40.

Further, the control section 27 has a function for correcting the displacement of the light spot on the minute deflecting mirror array 30 caused due to each mounting angle error in accordance with the excitation dichroic mirror 13a, 13b or 13c upon receiving the detection signal indicative of switching of each excitation dichroic mirror 13a, 13b or 13c from the excitation dichroic mirror switching sensor 42. The displacement of the light spot on the minute deflecting mirror array 30 with respect to each excitation dichroic mirror 13a, 13b or 13c is stored in the memory 43 in advance.

The effect of the scanning optical microscope having the above-described structure will now be explained.

Description will be first given as to the angle control of each minute deflecting mirror 31 within the diffraction diameter φD of the fluorescent spot light in the minute deflecting mirror array 30 when switched to the objective lens 18 or 20.

For example, when the control section 27 issues a selection command of the Ar laser device 3 to the acousto-optic device 9 of the laser unit 1, this acousto-optic device 9 selects a laser beam having an excitation wavelength of 488 nm outputted from the Ar laser device 3 and leads it to the single-mode fiber 10.

The laser beam having the excitation wavelength 488 nm is transmitted through the single-mode fiber 10 and led to the scanning unit 11. This laser beam is then formed into a parallel beam by the collimator lens 12, reflected by the excitation dichroic mirror 13, and scanned by the X/Y galvanometer mirrors 14a and mirrors 14b. Furthermore, it is transmitted through the pupil projection lens 15, reflected downwards by the mirror 16, and imaged as a light spot on the sample 2 through the image formation lens 17 and the objective lens 18.

At this moment, the light spot is scanned in the horizontal direction by the X galvanometer mirror 14a of the X/Y galvanometer mirrors 14a and mirrors 14b, then scanned for one pixel in the vertical direction by the Y galvanometer mirror mirrors 14b, and again scanned in the horizontal direction by the X galvanometer mirror 14a. This process is repeated.

The fluorescence having the central wavelength 520 nm by the fluorescent dye FITC generated when scanned on the sample 2 in the above-described manner proceeds in a direction opposite to the illumination optical path, namely, proceeds from the objective lens 18 to the image formation lens 17, the mirror 16, the pupil projection lens 15, the X/Y galvanometer mirrors 14a and mirrors 14b, and enters the confocal lens 19 through the excitation dichroic mirror 13a. The fluorescence is then condensed by the confocal lens 19 and imaged as a light spot on the minute deflecting mirror array 30.

At this moment, if the objective lens 18 is set on the optical axis, the objective lens switching mechanism 41 informs the control section 27 of a type of the objective lens 18.

When this control section 27 is informed of a type of the objective lens 18 from the objective lens switching mechanism 41, the control section 27 calculates the diffraction diameter φD of the light spot in the minute deflecting mirror array 30 based on the selected excitation wavelength (fluorescent light wavelength λ generated by 488 nm), the confocal length Fc of the confocal lens 19, the focal length Fp of the pupil projection lens 15, and the magnification B and a number of openings NA of the objective lens 18.

Thus, when the objective lens 18 is set on the optical axis, the control section 27 controls an angle of each minute deflecting mirror 31 within the diffraction diameter φD of the light spot in the minute deflecting mirror array 30 so that the fluorescence from the sample 2 is reflected on the optical path 33 which is an arrangement direction of the first and second photodetectors 24 and 26, and controls an angle of each minute deflecting mirror 31 so that an angle of each minute deflecting mirror 31 outside the diffraction diameter φD of the light spot is reflected on the optical path 32 different from the arrangement direction of the first and second photodetectors 24 and 26.

With the angle setting of each minute deflecting mirror 31 on the minute deflecting mirror array 30 mentioned above, the fluorescent light spot from the focusing surface of the sample 2 is reflected on each minute deflecting mirror within the diffraction diameter φD of the light spot and proceeds on the optical path 33. Moreover, the fluorescent light spot is reflected by the reflecting mirror 35 and enters the spectral dichroic mirror 22. As a result, the minute deflecting mirror array 30 serves as the reflecting type confocal pinhole.

The fluorescence of the fluorescent dye FITC which has entered the spectral dichroic mirror 22 is reflected here, and its unnecessary laser reflection light is cut by the barrier filter 23. Thus, only the fluorescence of the FITC enters the first photodetector 24.

The control section 27 fetches a signal from the first photodetector 24 and finally acquires a fluorescent image of the sample 2.

Subsequently, when the objective lens 18 is switched to the objective lens 40, the objective lens switching mechanism 41 informs the control section 27 of a type of the objective lens 40.

Upon being informed of a type of the objective lens 40 from the objective lens switching mechanism 41, the control section 27 calculates the diffraction diameter φD of the light spot in the minute deflecting mirror array 30 based on the selected excitation wavelength (fluorescent wavelength λ generated by 488 nm), the focal length Fc of the confocal lens 19, the focal length Fp of the pupil projection lens 15, the magnification B and numerical aperture NA of the objective lens 40.

Thus, when the objective lens 40 is switched, the control section 27 controls an angle of each minute deflecting mirror 31 within the diffraction diameter φD of the light spot in the minute deflecting mirror array 30 so that the fluorescence from the sample 2 is reflected on the optical path 33 which is an arrangement direction of the first and second photodetectors 24 and 26, and controls an angle of each minute deflecting mirror 31 so that an angle of each minute deflecting mirror 31 outside the diffraction diameter φD of the light spot is reflected on the optical path 32 different from the arrangement direction of the first and second photodetectors 24 and 26.

With the angle setting of each minute deflecting mirror 31 in the minute deflecting mirror array 30, the fluorescent light spot from the focusing surface from the sample 2 is reflected by each minute deflecting mirror within the diffraction diameter φD of the light spot. In addition, the fluorescent light spot is reflected by the reflecting mirror 35 and enters the spectral dichroic mirror 22. As a result, the minute deflecting mirror array 30 serves as the reflecting type confocal pinhole.

The fluorescence of the fluorescent dye FITC which has entered the spectral dichroic mirror 22 is reflected here, and its unnecessary laser reflected light is cut by the barrier filter 23. Thus, only the fluorescence of the FITC enters the first photodetector 24.

The control section 27 fetches a signal from the first photodetector 24 and finally acquires a fluorescent image of the sample 2.

As described above, since a type of the currently used objective lens is recognized by the control section 27, it is possible to rapidly and assuredly control the dimension of the reflecting type pinhole which can be matched with the diffraction diameter determined by the magnification and NA of the objective lens and the fluorescent light wavelength even when the objective lens is switched.

Description will now be given as to correction of the displacement of the light spot on the minute deflecting mirror array 30 which is caused due to each mounting angle error when the excitation dichroic mirror 13a is switched to the excitation dichroic mirror 13b or 13c having another wavelength characteristic.

The acousto-optic device 9 is first used to select the laser beam having the excitation wavelength of 488 nm outputted from the Ar laser device 3 for example, and the excitation dichroic mirror 13a is included in the optical path. This laser beam is transmitted through the single-mode fiber 10 and led to the scanning unit 11. This laser beam is then imaged as a light spot on the sample 2 which is dyed to, for example, the fluorescent dye FITC, through the collimator lens 12, the excitation dichroic mirror 13a, the X/Y galvanometer mirrors 14a and mirrors 14b, the pupil projection lens 15, the mirror 16, the image formation lens 17, and the objective lens 18.

Figure 14:
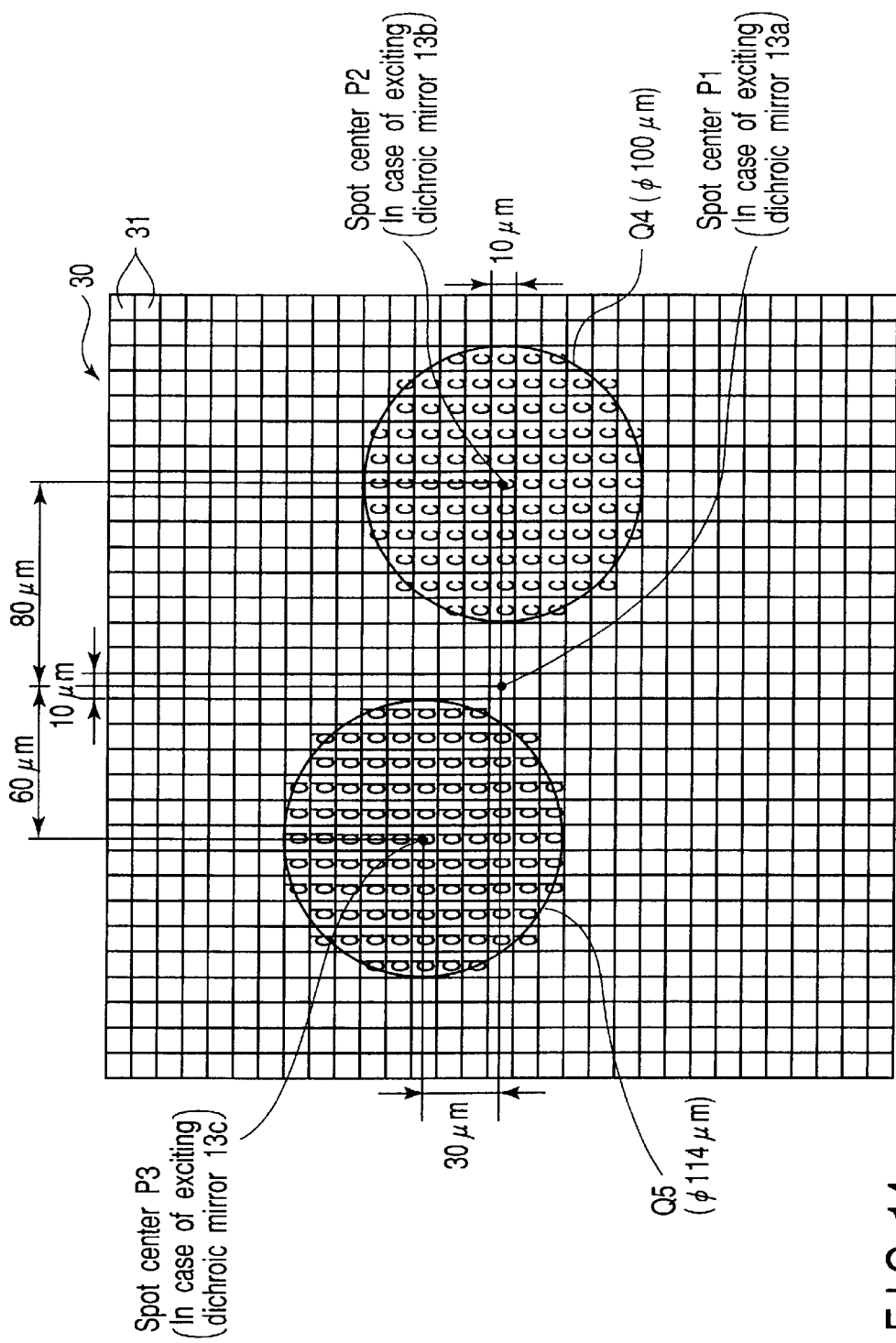
FIG. 14 is a view showing the angle control of each minute deflecting mirror with respect to correction of the displacement of a light spot on a minute deflecting mirror array in the seventh embodiment of the scanning optical microscope according to the present invention.

The fluorescence having the central wavelength 520 nm by the fluorescent dye FITC generated in the sample 2 proceeds in a direction opposite to the illumination optical path, namely, proceeds from the objective lens 18 to the image formation lens 17, the mirror 16, the pupil projection lens 15 and the X/Y galvanometer mirrors 14a and mirrors 14b, passes through the excitation dichroic mirror 13a, and enters the confocal lens 19. The fluorescence is then condensed by the confocal lens 19 and imaged as a light spot on the minute deflecting mirror array 30. FIG. 14 shows the center of the light spot which is imaged on the minute deflecting mirror array 30 when the excitation dichroic mirror 13a is set in the optical path. The spot center is determined as P1.

When switching to the excitation dichroic mirror 13b in the state where the excitation dichroic mirror 13a is set in the optical path, the excitation dichroic mirror switching sensor 42 detects the excitation dichroic mirror 13b switched and arranged in the fluorescent optical path and transmits its detection signal to the control section 27.

The control section 27 receives the detection signal indicative of switching of the excitation dichroic mirror 13b from the excitation dichroic mirror switching sensor 42, and corrects the displacement of the light spot on the minute deflecting mirror array 30 caused due to each mounting angle error in accordance with this excitation dichroic mirror 13b.

That is, when the excitation dichroic mirror 13a is switched to 13b in the state where the excitation dichroic mirror 13a is set in the optical path, an angle of the fluorescence incident upon the confocal lens 19 is shifted, e.g., approximately 80" in the lateral direction due to an angle error of the excitation dichroic mirror 13b relative to the excitation dichroic mirror 13a.

Therefore, the central position of the fluorescent light spot on the minute deflecting mirror array 30 is moved from the spot center P1 when the excitation dichroic mirror 13a is set in the optical path to the spot center P2 by switching to the excitation dichroic mirror 13b.

Assuming that the focal length of the confocal lens 19 is, for example, 200 nm, the distance S between the excitation dichroic mirrors 13a and 13b is as follows $$S = 200 \cdot \tan(80") = 80 \, \mu m$$

It is to be noted that a position of the spot center P2 is previously stored in the memory 43 as a position corresponding to the excitation dichroic mirror 13b.

At this moment, since the sample 2 is excited by the laser beam having the excitation wavelength of 488 nm and the fluorescence having the central wavelength of 520 nm of the fluorescent dye FITC is generated, the diffraction diameter φD on the minute deflecting mirror array 30 is 100 μm.

Therefore, the control section 27 controls an angle of each minute deflecting mirror 31 within the diffraction diameter φD (within the area Q4) with the spot center P2 at the center thereof in the minute deflecting mirror array 30, and causes the fluorescence reflected by each minute deflecting mirror 31 to proceed on the optical path 33 which is in the arrangement direction of the first photodetector 24.

As a result, the fluorescence from the focusing surface of the sample 2 is reflected by each minute deflecting mirror 31 in the area Q4 and proceeds on the optical path 33. This fluorescence is further reflected by the reflecting mirror 35 and enters the spectral dichroic mirror 22 on which the fluorescence is reflected. The unnecessary laser beam is cut by the barrier filter 23, and only the fluorescence of the FITC enters the first photodetector 24.

The control section 27 fetches a signal from the first photodetector 24 and finally acquires a fluorescent image of the sample 2.

Subsequently, it is assumed that the acousto-optic device 9 selects the laser beam having the excitation wavelength 543 nm outputted from the HeNe-G laser device 4 by a selection command from the control section 27 and the excitation dichroic mirror is switched to the counterpart 13c.

The excitation dichroic mirror switching sensor 42 detects the excitation dichroic mirror 13c which has been switched and arranged in the fluorescent optical path and transmits its detection signal to the control section 27.

This control section 27 receives the detection signal indicative of switching to the excitation dichroic mirror 13c from the excitation dichroic mirror switching sensor 42, and corrects the displacement of the light spot on the minute deflecting mirror array 30 caused due to each mounting angle error in accordance with this excitation dichroic mirror 13c.

That is, when the excitation dichroic mirror 13a is switched to the counterpart 13c in the state where the excitation dichroic mirror 13a is set in the optical path, an angle of the fluorescence incident upon the confocal lens 19 is shifted, e.g., approximately −60" in the lateral direction due to an angle error of the excitation dichroic mirror 13c relative to the excitation dichroic mirror 13a.

Therefore, the central position of the fluorescent light spot on the minute deflecting mirror array 30 is the spot center P1 when the excitation dichroic mirror 13a is set in the optical path as shown in FIG. 14, but it moves to the spot center P3 when the excitation dichroic mirror is switched to the counterpart 13b.

Assuming that the focal length of the confocal lens 19 is, e.g., 200 mm, the distance S between the excitation dichroic mirrors 13a and 13c is as follows:

$$S = 200 \cdot \tan(-60") = -60 \, \mu m \text{ (lateral direction)}$$

It is to be noted that a position of the spot center P3 is previously stored in the memory 43 as a position corresponding to the excitation dichroic mirror 13c.

At this moment, since the sample 2 is excited by the excitation laser beam having the excitation wavelength 543 nm and the fluorescence having the central wavelength of approximately 590 nm by the fluorescent dye PI is generated, the diffraction diameter φD on the minute deflecting mirror array 30 is 114 μm.

Therefore, the control section 27 controls an angle of each minute deflecting mirror 31 within the diffraction diameter φD (area Q5) with the spot center at its center and causes the fluorescence reflected on each minute deflecting mirror 31 to proceed on the optical path 33 which is in the arrangement direction of the second photodetector 26.

Consequently, the fluorescence from the focusing surface of the sample 2 is reflected on each minute deflecting mirror 31 in the area Q5 and proceeds on the optical path 33. The fluorescence is further reflected by the reflecting mirror 35 and passes through the spectral dichroic mirror 22. The barrier filter 25 is used to cut the unnecessary laser beam, and only the fluorescence of the PI enters the second photodetector 26.

The control section 27 fetches a signal from the second photodetector 26 and finally acquires a fluorescent image of the sample 2.

As described above, in the seventh embodiment, there are provided a first function for controlling an angle of each minute deflecting mirror 31 within the diffraction diameter φD of the fluorescent spot light in the minute deflecting mirror array 30 when the fluorescent light wavelength or the objective lens is switched, and a second function for correcting the displacement of the light spot on the minute deflecting mirror array 30 caused due to each mounting angle error when the excitation dichroic mirror is switched to 13a, 13b or 13c. Therefore, it is possible to control and obtain the diffraction diameter φD which is optimum for the fluorescent spot light in the minute deflecting mirror array 30 even when the objective lens is switched, and this embodiment can thereby serve as the reflecting type confocal pinhole.

Furthermore, when the excitation dichroic mirror is switched to 13a, 13b or 13c, it is possible to correct the displacement of the light spot on the minute deflecting mirror array 30 caused due to each mounting angle error. Thus, one minute deflecting mirror array which does not require a mechanical transmission unit using a motor and the like as a source of power can realize opening/closing of the pinhole which needs the high accuracy, position correction of two axes within a plane and a total of three drive mechanisms, thereby obtaining the high reliability with the reduced abrasion of the driving section. Moreover, it is possible to eliminate a number of design steps and reduce the size of the apparatus.

Incidentally, the present invention is not restricted to the first to seventh embodiments, and various modifications are possible without departing from its scope on the embodying stage.

In addition, the above-described embodiments include the invention on the various stages, and a variety of the inventions can be extracted by appropriately combining these stages in a plurality of disclosed structural requirements. For example, even if some structural requirements are deleted from all the structural requirements shown in the embodiments, the problems described in the section "problems to be solved by the invention" can be solved. When the effects described in the section "effects of the invention" an be obtained, the structure in which these structural requirements are deleted can be extracted as the present invention.

For example, the seventh embodiment can be modified as follows. That is, the confocal lens and the minute deflecting mirror array may be provided in accordance with each detection channel at the rear of a plurality of the switching type spectral dichroic mirrors for dividing the lights to the first and second photodetectors 24 and 26 for each wavelength.

Figure 15:
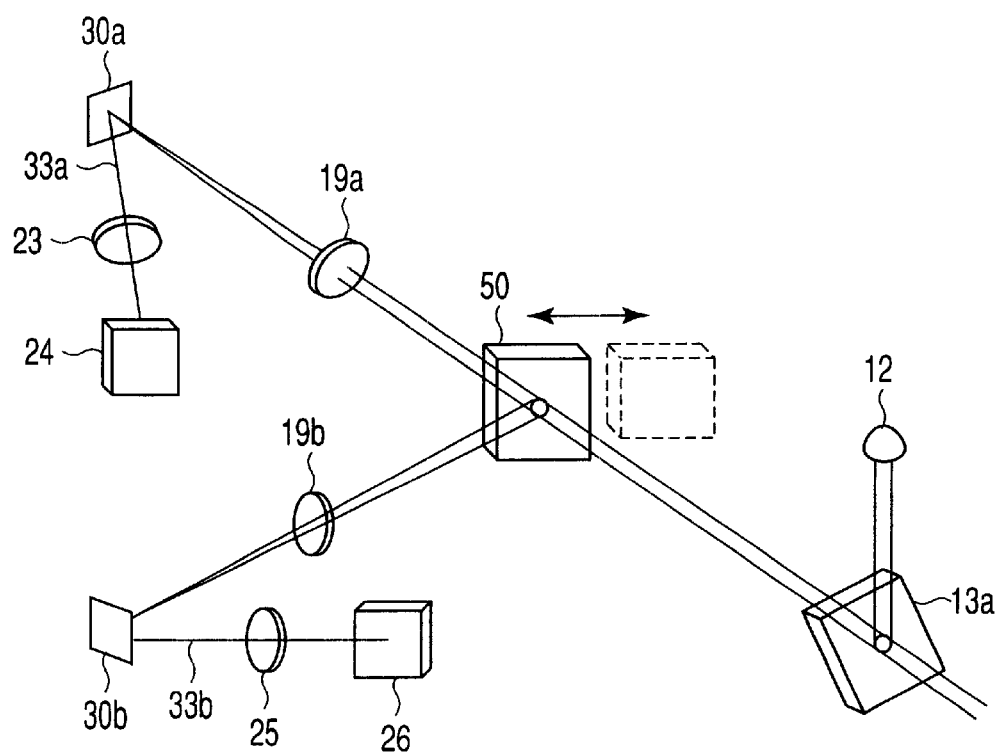
FIG. 15 is a partial block diagram showing the case where a confocal lens and a minute deflecting mirror array are provided at the rear of a switching spectral dichroic mirror in the scanning optical microscope according to the present invention.

FIG. 15 is a partial block diagram showing a scanning optical microscope when the confocal lens and the minute deflecting mirror array are provided at the rear of such a switching type spectral dichroic mirror. The switching type spectral dichroic mirror 50 is arranged on the optical path of the fluorescence which has passed through, e.g., the excitation dichroic mirror 13a among the excitation dichroic mirrors 13a, 13b and 13c.

The minute deflecting mirror array 30a is arranged on the transmission optical path of the switching type spectral dichroic mirror 50 through the confocal lens 19a as the 1CH side. Additionally, the first photodetector 24 is arranged on the reflection optical path 33a of the minute deflecting mirror array 30a through the barrier filter 23.

On the other hand, the minute deflecting mirror array 30b is arranged on the reflection optical path of the switching type spectral dichroic mirror 50 through the confocal lens 19b as the 2CH side. Further, the second photodetector 26 is arranged on the reflection optical path 33b of the minute deflecting mirror array 30b through the barrier filter 25.

In this case, when the spectral dichroic mirror 50 is switched, its angle error also affects the displacement of the light spot on the minute deflecting mirror array 30a or 30b. Accordingly, when either or both of the respective excitation dichroic mirrors 13a, 13b and 13c and the spectral dichroic mirror 50 are switched, the position correction can be executed with respect to the displacement of the light spot in the minute deflecting mirror array 30a or 30b.

Moreover, for example, although the minute deflecting mirror array 30 is used as the minute device group, the present invention is not restricted thereto. For example, liquid crystal may be used as the minute device group. In this case, the minute device for transmitting the light therethrough or the minute device for blocking the light is selected and controlled by controlling the electrode of each element (defined as the minute device) aligned in the matrix form.

Therefore, when the control is effected in such a manner that the electrode of each minute device in the minute device group positioned in the area of the light spot is in the transmission mode and the electrode of any other minute device is in the blocking mode, the light transmitted thorough the liquid crystal can be detected by the photodetector 24 or 15, and the light from any other element (minute device) is blocked and is not detected by the photodetector 24 or 15. Thus, the minute device group can be used as the transmission type confocal pinhole means. Furthermore, in the liquid crystal, the speed for controlling each element can be increased.

When the minute device group using the liquid crystal is applied to the scanning optical microscope shown in FIG. 7, it is needless to say that the optical path 33 reflected by the minute deflecting mirror array 30 becomes the path of the light which has passed through the liquid crystal used instead of the minute deflecting mirror array 30 in case of using the liquid crystal.

Moreover, as the minute device group, a two-dimensional CCD in which a plurality of photo acceptance pixels (defined as minute devices) are arranged in the form of a matrix may be used. In this case, a sum total of accepted light intensity of pixels in a pixel group (minute device group) positioned in the area of the light spot is used as a detection signal, and any other pixel can not be electrically detected, or its detection signal is not added even if such a pixel is detected. Thus, selection and control of any other minute devices which are controlled so as to be detected by the photodetector can be carried out by choosing the detection signals of the respective pixels. Accordingly, the optical path 33 to the photodetector and the following structures after the minute deflecting mirror array 30 shown in FIG. 7 are no longer necessary.

In addition, the microscope can be realized by a simple structure which can share the minute device group and the photodetector by one device. Incidentally, when this modification is applied to FIG. 7, it is needless to say that the minute deflecting mirror array 30 substitutes for the CCD and the following optical path 33 is no longer necessary.

Additionally, although the minute deflecting mirror array 30 has a plurality of minute deflecting mirrors 31 being arranged in the two-dimensional matrix as shown in FIG. 8, the minute deflecting mirrors 31 may be arranged at random positions and form a group.

Further, although the first to seventh embodiments have described the scanning optical microscope for exciting the sample 2 dyed with the fluorescent dyes and observing its fluorescences through the confocal pinhole, these embodiments can be of course applied to the scanning optical microscope for observing the transmission lights and the reflection lights from the sample 2 through the confocal pinhole.

Furthermore, although the sample is used in a biosystem dyed with the fluorescent dyes in the foregoing embodiments, the present invention is not restricted thereto, and the sample may be used in, for example, an industrial system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scanning optical microscope comprising:
   a light source configured to selectively output to a sample dyed with two or more types of fluorescent dyes an excitation light having an excitation wavelength according to each of said fluorescent dyes;
   scanner configured to scan said excitation light outputted from said light source;
   an objective lens configured to condense said excitation light scanned by said scanner on said sample;
   a detector configured to detect a fluorescence from said fluorescent dye according to said excitation light by using said excitation light condensed by said objective lens;
   one confocal pinhole whose pinhole diameter arranged in front of said detector is adjustable; and
   controller configured to adjust said pinhole diameter of said confocal pinhole to a diameter suitable for said fluorescence emitted from said sample by said excitation light in synchronization with switching of said excitation light from said light source, when acquiring one image by detecting each fluorescence according to said each excitation light in a time division manner through said confocal pinhole by switching said excitation light with which said sample is irradiated in synchronization with scanning by scanner.

2. The scanning optical microscope according to claim 1, wherein
   said confocal pinhole is a minute device group having a plurality of minute devices and
   said plurality of said minute devices are controlled by a minute device group controller.

3. The scanning optical microscope according to claim 1, wherein said confocal pinhole includes a minute device group configured by arranging a plurality of minute deflecting mirrors in a two-dimensional matrix form, further comprising minute device group controller configured to control an angle of each minute deflecting mirror within a diffraction diameter so as to reflect a light spot in an arrangement direction of said detector, and to control an angle of said each minute deflecting mirror outside said diffraction diameter to an angle different from said angle of said each minute deflecting mirror within said diffraction diameter.

4. The scanning optical microscope according to claim 1, wherein said controller switches said excitation light in synchronization with scanning by said light scanner in accordance with each one line with respect to said sample.

5. The scanning optical microscope according to claim 4, wherein
   said confocal pinhole is a minute device group having a plurality of minute devices, and
   said plurality of said minute devices are controlled by a minute device group controller.

6. The scanning optical microscope according to claim 4, wherein said confocal pinhole includes a minute device group configured by arranging a plurality of minute deflecting mirrors in a two-dimensional matrix form, further comprising a minute device controller configured to control an angle of said each minute deflecting mirror within a diffraction diameter so as to reflect a light spot in an arrangement direction of said detector, and to control an angle of said each minute deflecting mirror outside said diffraction diameter to an angle different from said each angle of said each minute deflecting mirror in said diffraction diameter.

7. The scanning optical microscope according to claim 1, wherein said controller switches said excitation lights in synchronization with scanning by said scanner in accordance with each one frame.

8. The scanning optical microscope according to claim 7, wherein said confocal pinhole is a minute device group having a plurality of minute devices, and
   said plurality of said minute devices are controlled by a device controller.

9. The scanning optical microscope according to claim 7, wherein said confocal pinhole includes a minute device group configured by arranging a plurality of minute deflecting mirrors in a two-dimensional matrix form, further comprising minute device group controller configured to control an angle of said each minute deflecting mirror within a diffraction diameter so as to reflect a light spot in an arrangement direction of said detector, and to control an angle of said each minute deflecting mirror out side said diffraction diameter to an angle different from said angle of said each minute deflecting mirror in said diffraction diameter.

10. The scanning optical microscope according to claim 1, wherein said controller switches said excitation lights in units of pixel during scanning with respect to said sample by said scanner.

11. The scanning optical microscope according to claim 10, wherein
    said confocal pinhole is a minute device group having a plurality of minute devices, and
    said plurality of said minute devices are controlled by a minute device controller.

12. The scanning optical microscope according to claim 10, wherein said confocal pinhole includes a minute device group configured by arranging a plurality of minute deflecting mirrors in a two-dimensional matrix form, further comprising minute device group controller to control an angle of said each minute deflecting mirror within a diffraction diameter so as to reflect a light spot in an arrangement direction of said detector, and to control an angle of said each minute deflecting mirror outside said diffraction diameter to an angle different from said angle of said each minute deflecting mirror within said diffraction diameter.

13. The scanning optical microscope according to claim 1, wherein said microscope includes a single detector.

14. The scanning optical microscope according to claim 13, further comprising a barrier filter which is fixed in front of said detector, blocks two or more types of excitation lights for exciting said two or more types of fluorescences, and transmits therethrough said two or more types of fluorescences emitted by said sample by said excitation lights.

15. The scanning optical microscope according to claim 13, further comprising:

a first barrier filter for blocking a first excitation light of said excitation lights and transmitting therethrough said fluorescence emitted from said sample by said first excitation light;

a second barrier filter for blocking a second excitation light of said excitation lights and transmitting therethrough said fluorescence emitted from said sample by said second fluorescence; and means for switching said first barrier filter and said second barrier filter between said confocal pinhole and said detector in synchronization with change of said excitation lights.

16. The scanning optical microscope according to claim 1, wherein said microscope includes a plurality of detectors.

* * * * *